United States Patent [19]

May, Jr.

[11] 3,770,894

[45] Nov. 6, 1973

[54] AUTOMATIC TRANSMISSION LINE TESTING SYSTEM

[75] Inventor: Carl Jerome May, Jr., Holmdel, N.J.

[73] Assignee: Bell Telephone Laboratories, Incorporated, Murray Hill, N.J.

[22] Filed: Sept. 25, 1972

[21] Appl. No.: 291,942

[52] U.S. Cl. .............................................. 179/15 BF

[51] Int. Cl. .............................................. H04j 5/00

[58] Field of Search ..................... 179/15 AS, 15 BF

[56] References Cited

UNITED STATES PATENTS 3,042,752 7/1962 Fulmer ........................... 179/15 AS 3,603,736 9/1971 Morrell .......................... 179/15 AS 3,424,868 1/1967 Saal ............................... 179/15 BF

*Primary Examiner*—Ralph D. Blakeslee

*Attorney*—W. L. Keefauver et al.

[57] ABSTRACT

A time assignment speech interpolation system is disclosed utilizing time-shared common control processing circuits. Speech signals from a plurality of trunks are interpolated on a lesser plurality of long-haul transmission channels by connecting trunks only during active periods. In order to detect channel failures rapidly, each channel is automatically tested in a sequence by transmitting a test tone preceded and followed by a silent period. Channel delay is measured during the initial silent period. Transmission gain is measured during the test tone and noise is measured during the terminal silent period. Priority checking is provided for channels about to be restored to service and for channels which have failed once.

15 Claims, 19 Drawing Figures

TIME ASSIGNMENT SPEECH INTERPOLATION SYSTEM

CLOCK PULSES

TIMING DIAGRAM

GENERAL PURPOSE
STORAGE REGISTER

GENERAL PURPOSE
CONTROL REGISTER

BUFFER STORES
(100 TIME SLOTS)

CHANNEL STORES
(100 TIME SLOTS)

GATE STORES
(100 TIME SLOTS)

TRANSMITTING SWITCH

RECEIVING SWITCH

CHANNEL CHECK INITIATE (RECEIVER)

CHANNEL CHECK TONE CIRCUITS

AUTOMATIC TRANSMISSION LINE TESTING SYSTEM

BACKGROUND OF THE INVENTION

1. Field of the Invention

This invention relates to multichemical signal transmission systems and, more particularly, to automatic channel testing arrangements for such systems.

2. Description of the Prior Art

It is known to utilize transmission capacity more efficiently by interpolating signals from different sources on the same transmission channel, taking the channel away from a source not currently using it and giving that channel to a source currently requesting service. An example of such a system is the time assignment speech interpolation (TASI) system disclosed in A. R. Kolding et al. U.S. Pat. No. 2,957,946, granted Oct. 25, 1960. Such systems depend upon having a sufficient number of signal sources so as to take advantage of the statistical properties of signal utterances from each source. Telephone conversations have such properties and can be interpolated in the manner taught in the Kolding patent.

In transmission systems such as TASI systems in which channels are used at or near their transmission capacity, it is particularly important to detect channel failures quickly. Undetected failures in such systems degrade many conversations rather than a single conversation. On the other hand, the heavy loading on each channel makes it undesirable to remove such channels from service for any protracted period.

In addition to the usual transmission gain and channel noise measurements, it is also desirable on long-haul transmission channels to provide measurements of transmission delay. In TASI systems, such as described above, it is necessary to synchronize end point switching of the channels to insure delivery of each signal spurt to the appropriate receiving device. One system for accomplishing such synchronization is disclosed in the copending application of R. E. LaMarche et al. Ser. No. 212,920, filed Dec. 28, 1971 and assigned to applicant's assignee. In order to provide such synchronization, it is necessary to have available current measurements of the transit time delay of each transmission channel.

It has been common in the prior art to provide these channel measurements by occasionally withdrawing each channel from service and manually measuring the desired parameters. Besides being a slow and cumbersome procedure, this method results in withdrawing transmission facilities from service for long periods of time and forces checking cycles to become excessively long.

SUMMARY OF THE INVENTION

In accordance with the present invention, an automatic channel checking routine is provided to check all of the time-shared transmission equipment utilized in a system such as TASI. The channel check sequence includes a measurement of gain, noise and relative delay (relative to a standard channel). During the automatic check, a timed silent interval followed by a timed test tone, again followed by a timed silent interval, is transmitted over the channel which is being tested. At the receiving end, the transit time delay of the channel is measured during the first silent interval. The transmission level or gain is measured during the tone burst and noise is measured during the final silent interval.

A sequencing mechanism is provided to permit channel checking to proceed sequentially through all working channels. The channel checking function awaits the release of each channel by an active talker. This awaiting feature has the advantage that during a period of heavy load, the checking routine will experience considerable awaiting, thus removing the channel checking function as a load on the transmission capacity at the very time when it is least needed and most likely to interfere with signal transmissions.

Also, in accordance with the present invention, there is provided a routine for checking specific transmission channels on a priority basis. All priority checks are completed before the normal channel checking sequence can proceed. Such priority checking is undertaken in two circumstances: first, any time a channel is about to be restored to service following an outrage, and second, whenever a channel check has indicated a faulty or marginal cahnnel condition. Under the latter circumstance, it is desirable to recheck the channel before removing it from service and disrupting current usage.

These and other objects and features, the nature of the present invention and its various advantages, will be more readily understood upon consideration of the attached drawings and the following description of the drawings.

DETAILED DESCRIPTION

Figure 1:
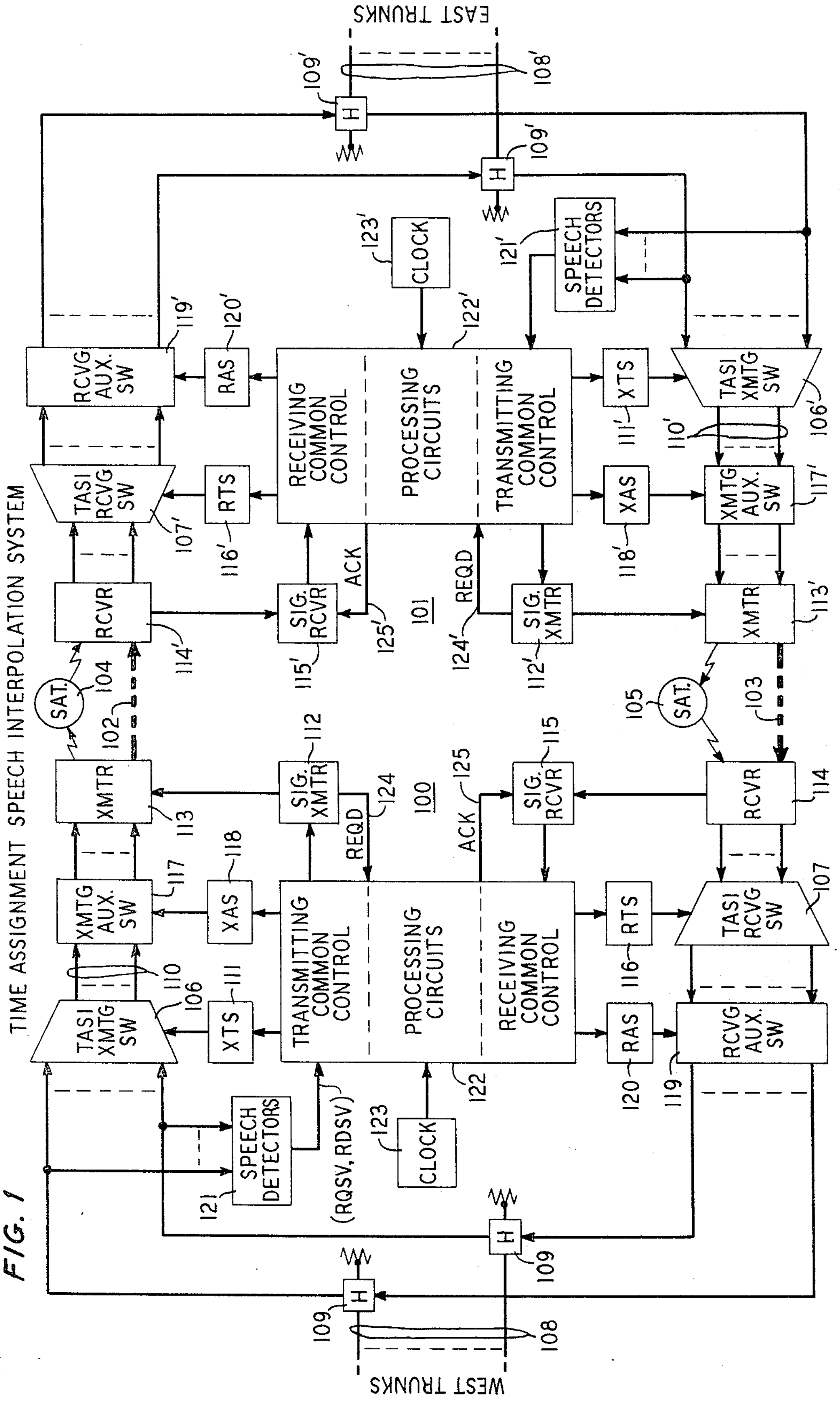
FIG. 1 is a general block diagram of a time assignment speech interpolation system suitable for utilizing the principles of the present invention.

FIG. 1 is a general block diagram of a TASI system. As illustrated, two terminals 100 and 101 are required, each terminal generally comprising transmitting circuits, receiving circuits and common processing equipment. Terminals 100 and 101 are identical and are interconnected by both land or undersea cable circuits 102 and 103, as well as satellite circuits 104 and 105. Circuits 102 and 104 connect terminals 101 and 100 in one direction, while circuits 103 and 105 connect these terminals in the opposite direction. Since terminals 100 and 101 are identical, only terminal 100 will be described in detail. Corresponding elements of terminal 101 will be identified with the same reference numeral, primed.

A TASI transmitting switch 106 and a TASI receiving switch 107' are required to interpolate the transmitted speech from trunks 108 to the remote terminal. Hybrid circuits 109 separate the transmitted and received speech signals.

Transmitting switch 106 interpolates speech from a plurality of trunks 108 on to a lesser plurality of transmitting channels 110 by connecting newly active trunks to currently available channels. Transmitting switch 106 is under control of a transmitting trunk store 111 which records the current assignment of trunks to transmission channels. These assignments are transmitted to the remote terminal by way of a signaling transmitter 112, which is connected to special control channels by way of a transmitter 113. These assignments are separated by receiver 114' and detected by signaling receiver 115' to duplicate the assignments in receiving trunk switch 116'. Transmitter 113 and receiver 114 may be conventional signal transmission devices.

In order to prevent audible "clicks" when connections are changed, a transmitting auxiliary switch 117 is provided under the control of transmitting auxiliary store 118, which operates slowly and thus masks out any audible "click." A receiving auxiliary switch 119', under the control of a receiving auxiliary store 120', performs a similar function at the remote terminal.

A speech detecting circuit 121 detects speech appearing on any one of input trunks 108 and relays control signals indicating such speech to processing circuits 122. In particular, speech detectors 121 provide a Request for Service (RQSV) signal for each trunk requesting service and an Enable Disconnect If Service (EDSV) signal for each trunk no longer requiring service. Processing circuits 122, under the control of clock circuit 123, perform the necessary processing to control the assignment of channels to trunks in response to speech detector output signals and currently existing assignments.

Signaling transmitter 112 indicates when it is available for signaling new assignments by a REQD Request Data signal on lead 124. Signals received by processing circuits 122' from signaling receiver 115' are acknowledged by a signal on ACK Acknowledge lead 125'.

A common control speech detector suitable for the time assignment speech interpolation system of FIG. 1 is disclosed in C. J. May, Jr., U.S. Pat. No. 3,520,999, granted July 21, 1970 and assigned to applicant's assignee.

Clock and Timing Circuits

Figure 2:
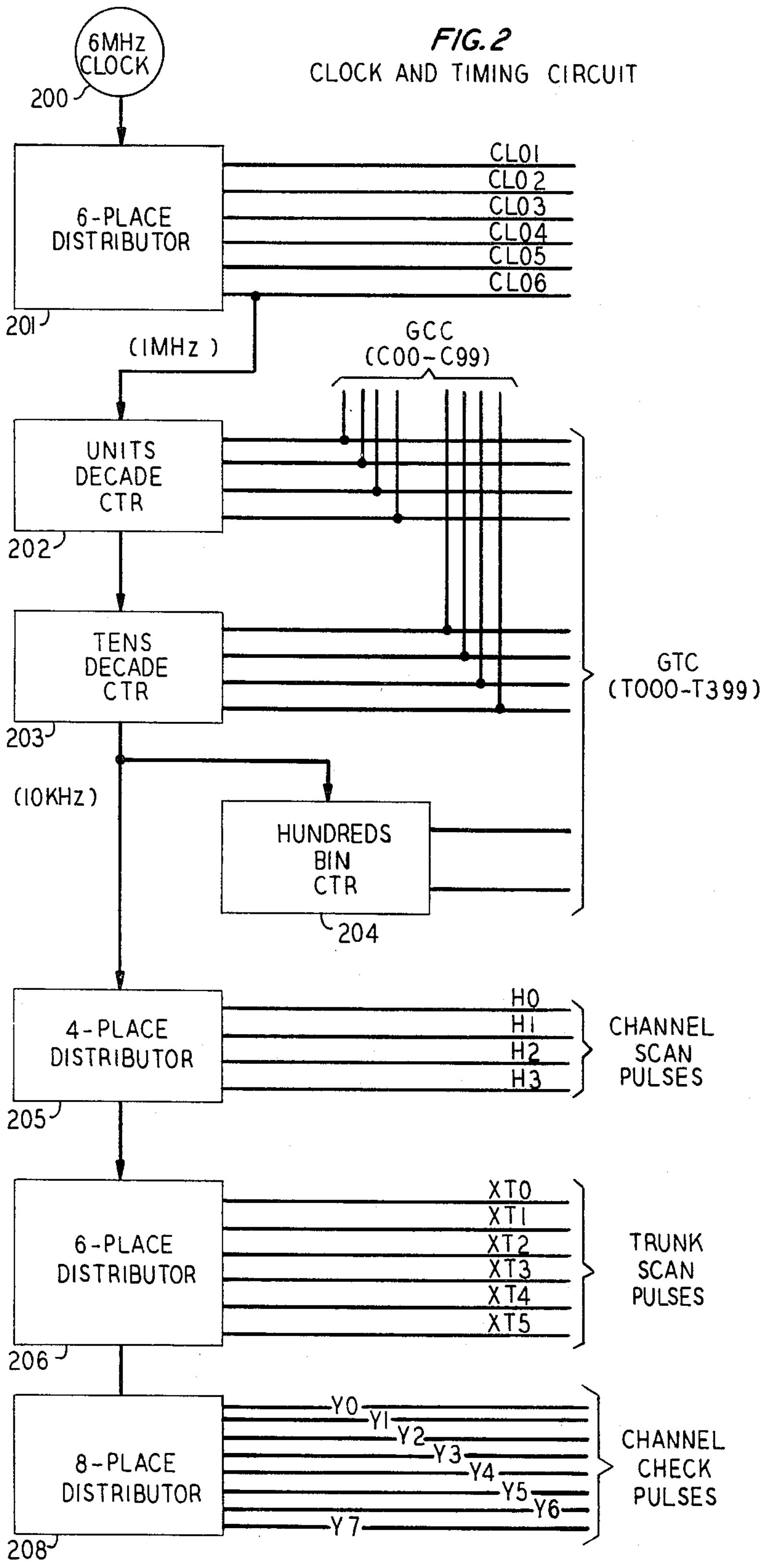
FIG. 2 is a block diagram of a clock and timing circuit suitable for use in the interpolation system of FIG. 1.

As illustrated in FIG. 1, each of the processing circuits 122 and 122' is under the control of a timing circuit 123 or 123', respectively. In FIG. 2, there is shown a schematic diagram of a clock circuit suitable for this purpose. A crystal-controlled clock source 200 drives a pulse distributor 201, which may comprise a ring counter, to divide the pulse train from clock 200 into six equally-spaced clock phases, identified in FIG. 2 as CL01 through CL06. The output of clock 200 is illustrated in FIG. 3(*a*), while the clock phases are illustrated in FIGS. 3(*b*) through 3(*g*).

The final clock phase from distributor 201 is used to drive a decade counter 202, the overflow from which is used to advance a second decade counter 203. Decade counter 203 comprises the tens digit position while counter 202 provides the units digit position for a two-digit generated channel code (GCC), identified in FIG. 2 as COO through C99. These generated channel codes correspond to the available channels in the transmission facilities connecting transmitter 113 to receiver 114' in FIG. 1. Pulses appearing in each numbered channel timeslot COO through C99 are as illustrated in FIGS. 3(*h*) through 3(*j*).

Figure 3:
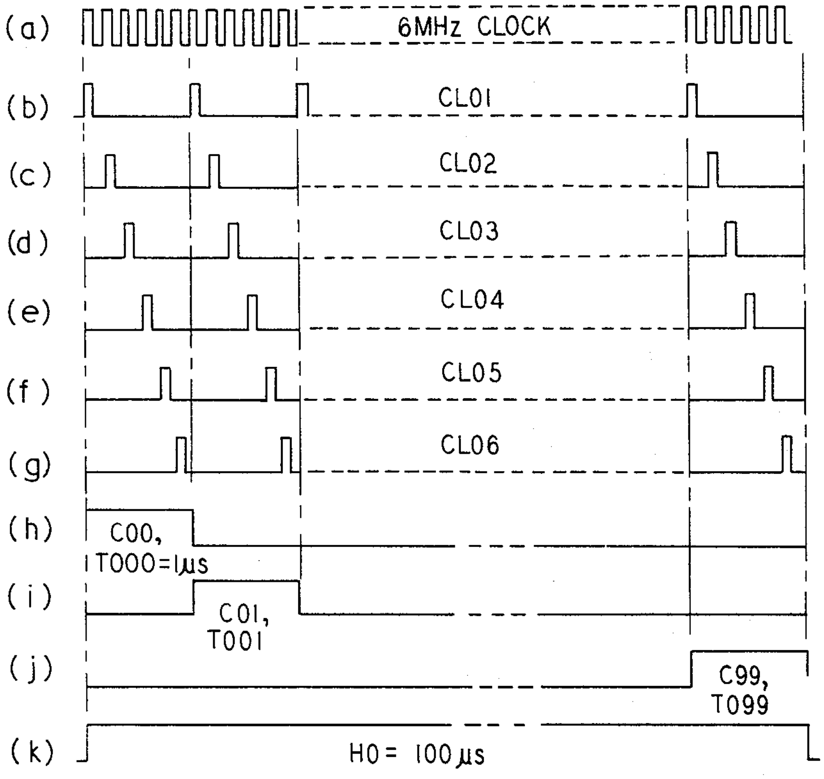
FIGS. 3 and 4 are graphical representations of timing pulses provided by the circuits of FIG. 2.

A timing pulse spanning the entire sequence from C00 to C99 is shown in FIG. 3(*k*). This pulse, identified as the HO channel scanning pulse, is 100 microseconds long since each of the channel pulses C00 through C99 is one microsecond long.

Figure 4:
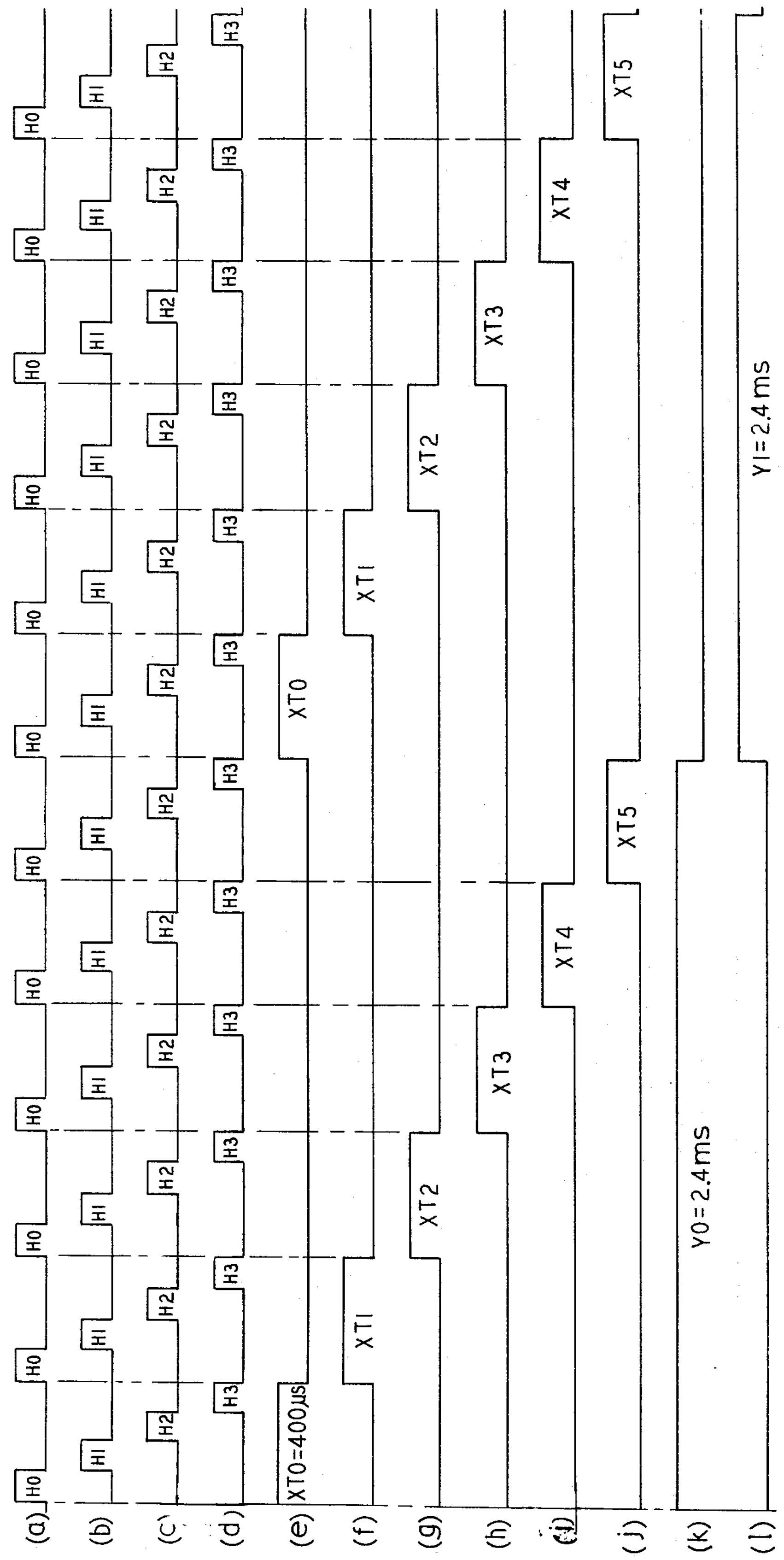

The overflow from tens decade counter 203 is applied to hundreds counter 204. Since only four hundreds need be counted, counter 204 is merely a binary counter having two stages. The outputs of counters 202, 203 and 204 provide a binary-coded-decimal number identifying each of the trunks 108 in FIG. 1. The codes thereby generated are called the generated trunk codes (GTC) and are identified as T000 through T399. This can be seen in FIGS. 3(*h*) through 3(*j*). These trunk codes are each spanned by a trunk scanning pulse, 400 microseconds long, coinciding with four successive channel scanning pulses. The trunk pulses are identified as T000 to T399, and correspond to four successive channel cycles. This arrangement is illustrated in FIG. 4 where the H0, H1, H2 and H3 pulses of FIGS. 4(*a*) through 4(*d*) correspond to successive channel scanning cycles, while the XTO pulse shown in FIG. 4(*e*) bridges this entire cycle. The XTO pulse, of course, corresponds to a complete trunk scanning cycle which is 400 microseconds in length.

Six successive trunk scanning cycles shown in FIGS. 4(*e*) through 4(*j*) comprise a channel check cycle shown in FIG. 4(*k*) as a YO pulse having a 2.4 millisecond duration. This is the channel check period and there are corresponding Y1, Y2, etc. periods, only Y1 being shown in FIG. 4 and also having a 2.4 millisecond duration.

The output at distributor 206 in FIG. 2 is applied to eight-place distributor 208 which provides eight pulses each 2.4 milliseconds in duration to correspond with the YO pulse (1) in FIG. 4, and occurring every 19.2 milliseconds. This represents the basic channel checking repetition interval. The Y1 pulse is shown as waveform (*m*) in FIG. 4.

The timing intervals illustrated in FIGS. 3 and 4 are utilized throughout the TASI system for timing purposes. They will hereinafter be identified simply by the lead identifications shown in FIG. 2.

General Purpose Registers

Figure 5:
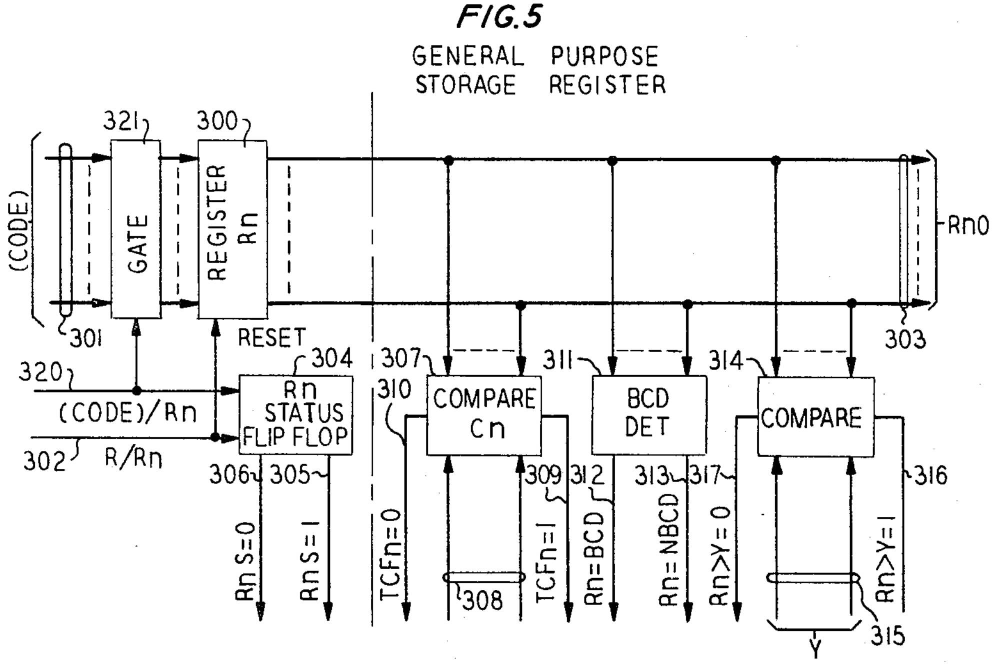
FIG. 5 is a block diagram of a general purpose storage register suitable for use in the interpolation system of FIG. 1.

In FIG. 5 there is shown a block diagram of a general purpose storage register 300 suitable for storing ten-bit codes arriving on input leads 301. Register 300 is identified as register Rn to indicate that the plurality of such registers are available. Indeed, in the embodiment of FIG. 1, seven such registers are utilized. Register 300 is loaded by a signal ((code)/Rn) on lead 320 to operate gate 321. A gate similar to gate 321 is provided for each different source of coded signals to be loaded into register 300. Register 300 may be reset to the all-zeros condition by a reset signal on lead 302, identified as "R/Rn."

A status flip-flop 304 is provided to indicate the presence of a valid code in register 300. This flip-flop is set for a command (code)/Rn on lead 320 which loads a code into Rn register 300. As (RnS=1) output signal is provided on lead 305. When the register is reset by a signal on lead 302 (R/Rn), a (RnS=0) output signal appears on lead 306.

The output of register 300 appears on output leads 303 to which are attached various detection circuits as follows:

A compare circuit 307 is provided to compare the output of register 300 with the code appearing on leads 308. If these codes are identical, an output (TCFn=1) appears on lead 309; otherwise, an output (TCFn=0) appears on lead 310.

A binary coded decimal (BCD) detector 311 is provided to detect whether or not the code stored in register 300 is a binary coded decimal code. The code is assumed to be a binary coded decimal code if all of the decimal positions are equal to or less than nine. When this is true, an output signal (Rn=BCD) appears on lead 312. If either of the decimal positions exceeds the value of nine, the stored code cannot be binary coded decimal information and an output signal (Rn=NBCD) appears on lead 313.

A compare circuit 314 is provided which compares the output of register 300 with a code Y appearing on lead 315. If the output of register 300 is greater than the code Y on lead 315, a signal (Rn >Y=1) is provided on output leads 316; otherwise, a signal (Rn >Y=0) appears on lead 317.

As previously indicated, a plurality of general purpose storage registers such as that disclosed in FIG. 5 are provided for the processing circuits of FIG. 1. The input codes to these registers are gated from the various other processing circuits while the output from register 300 is delivered to such processing circuits. These registers serve as general purpose storage mechanisms for coded information during the processing sequence.

Figure 6:
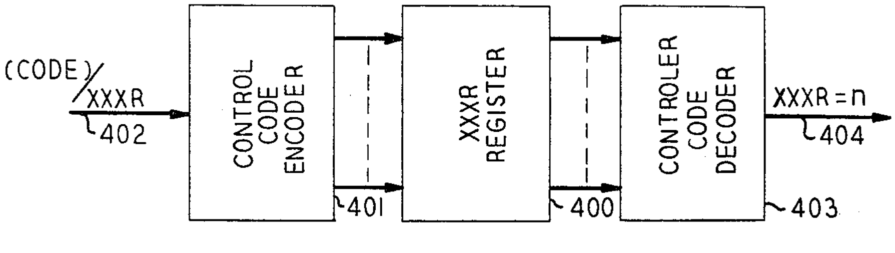
FIG. 6 is a block diagram of a general purpose control register suitable for use in the interpolation system of FIG. 1.

In FIG. 6 there is shown a general purpose control register 400 capable of storing a plurality of binary bits. Control register 400 is utilized to record the current state of processing of the various subfunctions necessary to make interconnections in the time assignment speech interpolation system of FIG. 1.

A control code encoder 401 translates an input signal on one of a plurality of input leads 402 into a corresponding binary code for storage in register 400. Conversely, a control code decoder 403 is provided to decode the binary output codes from register 400 to provide a signal on one-out-of-n output leads 404.

In general, the control register of FIG. 6, six of which are required, store is coded form the current step of a particular subfunction which must be asynchronously performed. The codes in register 400 cycle through the various steps in response to asynchronous input signals on inputs 402. The output signals to leads 404 serve to control the execution of the current steps.

Figure 7:
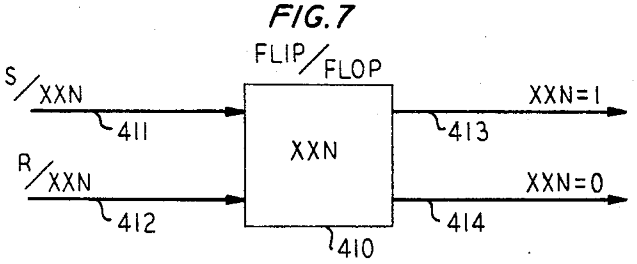
FIG. 7 is a schematic block diagram of a flip-flop circuit suitable for use in the interpolation system of FIG. 1.

In FIG. 7 there is shown a general purpose flip-flop circuit 410 which is set to its 1 state by signals on lead 411 and reset to its 0 state by signals on lead 412. When in its 1 state, flip-flop 410 produces an output (XXN=1) on lead 413 and while in its 0 state produces an output (XXN=0) on lead 414. Each of the circuits of FIGS. 5, 6 and 7 may comprise conventional semiconductor integrated circuits.

Storage Units

The processing circuits of FIG. 1 require a number of storage units for storing information concerning existing or contemplated interconnections of trunks and channels. These storage devices will be described in general in connection with FIGS. 8 through 11.

Figure 8:
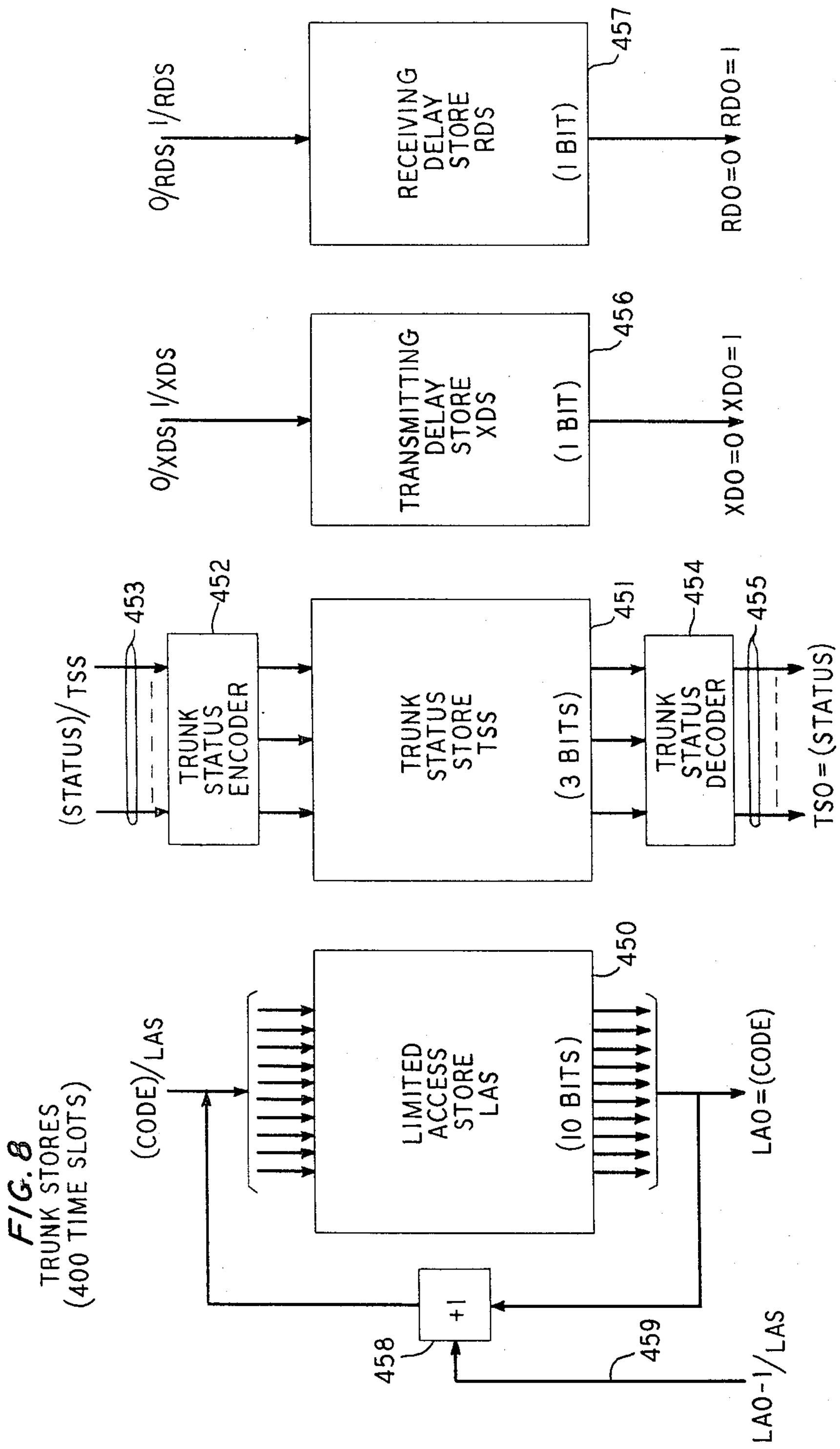
FIG. 8 is a block diagram of the trunk stores suitable for use in the interpolation system of FIG. 1.

In FIG. 8 there is shown the trunk stores which may be used with the Time Assignment Speech Interpolation (TASI) system of FIG. 1. These stores, which may, for example, comprise MOS integrated circuit shift register or, alternatively, delay line loops, are digital storage mechanisms. Each store in FIG. 8 has a length of 400 stages or positions through which binary information is moved, one position at a time for each timeslot shown in FIGS. 3(*h*) through 3(*j*). A plurality of such shift registers or delay lines is provided, one for each bit of a multi-bit binary word to be stored in the device. Controls are available to write new codes into the stores, erase codes already present in the stores, or recirculate codes leaving the stores.

As an example, the Limited Access Store (LAS) 450 in FIG. 8 utilizes ten bits and hence includes ten shift registers in parallel, each register being 400 stages long. The Limited Access Store 450 may advantageously comprise the speech detector stores described in the above-mentioned U.S. Pat. No. 3,520,999, granted July 21, 1970 to C. J. May, Jr., the present applicant. The Time Assignment Speech Interpolation system of FIG. 1 is capable of interpolating, at the maximum, only approximately 330 trunks on the 100-channel transmission system 102, 104. The balance of the timeslots in LAS store 450 can therefore be used as a scratch-pad memory to store various special codes for later use. A specific description of some of these codes will be provided hereinafter.

In order to better understand the diagrams of FIG. 8, the following observations are noted. The slash is used as part of a command. It indicates that the preceding quantity or value is to be loaded or placed into the succeeding location. Thus, in FIG. 8, the input to LAS store 450 is indicated as "(CODE)/LAS." This indicates that a particular code is to be placed into LAS store 450. Similarly, the output of each store comprises a multi-bit word which, for LAS store 450, is identified as "LAO" (Limited Access Output). An incrementing circuit 458 is provided to increment the contents of any storage timeslot of LAS store 450, under the control of an incrementing command (LAO+1/LAS) on lead 459 appearing in the appropriate timeslot.

Returning to FIG. 8, a Trunk Status STore (TSS) 451 is provided to store three-bit codes representing the status of each trunk connected to the TASI system of FIG. 1. These codes are derived from the trunk status encoder 452 to which a plurality of input leads 453 are applied. Each of input leads 453 corresponds to one particular status of the trunks. The function of encoder 452 is to convert the one-out-of-eight input signals on leads 453 into a three-bit binary code for insertion in TSS store 451. These codes are synchronized with the generation in FIG. 2 of the trunk codes (GTC) such that the status code stored in the timeslot during which a particular GTC code is generated represents the status of the trunk identified by that GTC code. A status decoder 454 decodes these binary codes and provides status indications (TSO) on output leads 455. In Table I there is given the identifications and descriptions of each trunk status.

TABLE I

Trunk Status Codes (TSS)

| Code | Description |
|---|---|
| TSO=D | Disconnected Trunk |
| SIG | Signaling (Connection in progress) |
| SV | Serviced Trunk |
| C1Q | Connect Group Queue 1 |
| C2Q | Connect Group Queue 2 |
| D1Q | Disconnect Group Queue 1 |
| D2Q | Disconnect Group Queue 2 |
| D3Q | Disconnect Group Queue 3 |

The meaning and use of some of the entires in Table I will be described in further detail hereinafter in connection with a description of the operation of the system of FIG. 1. For more details see the aforementioned LaMarchi et al. application.

In FIG. 8 there is also shown a Transmitting Delay Store (XDS) 456 and a Receiving Delay Store (RDS) 457. Each of these delay stores is also 400 stages long and includes only one bit of storage. This bit is used to store an indication of the type of transmission facility currently connected to the corresponding trunk. A 1, for example, can be used to indicate a satellite transmission channel and a 0 can be used to indicate a submarine cable channel. This information is used to minimize the delay variations is successive transmissions from the same trunk.

Figure 9:
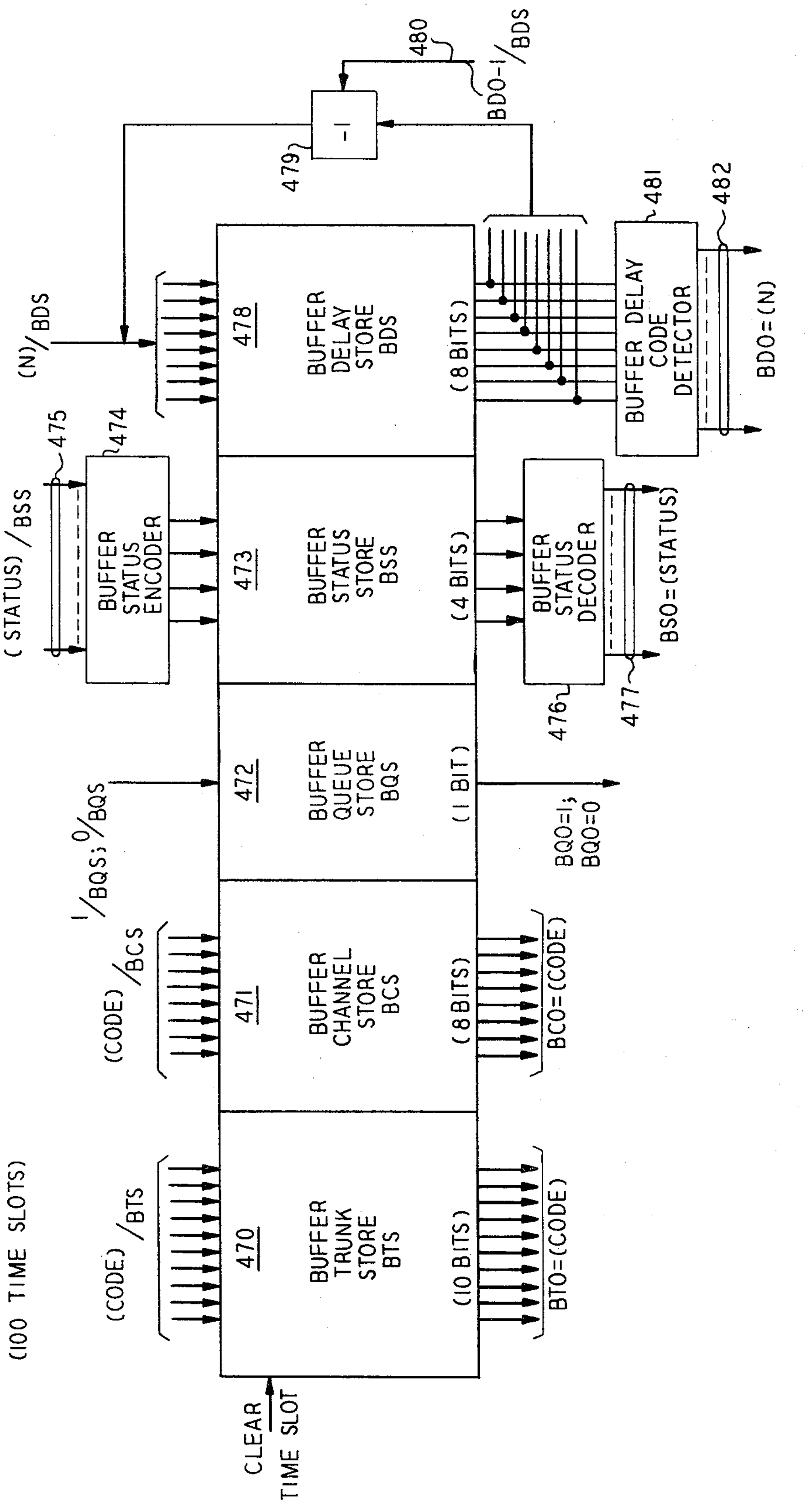
FIG. 9 is a block diagram of the buffer stores suitable for use in the interpolation system of FIG. 1.

In FIG. 9 there is shown a block diagram of a plurality of storage units identified as buffer stores. These storage units are each 100 stages or timeslots in length. The buffer stores of FIG. 9 are utilized to temporarily store trunk-channel assignments during preliminary activities prior to the actual connection of the trunk to the channel. Such preliminary actions may include, for example, timing the interval required to operate the auxiliary switches 117 and 119 (FIG. 1). Also certain auxiliary messages are temporarily stored in the buffer store before being signaled to the remote receiver.

The buffer stores of FIG. 9 include a Buffer Trunk Store (BTS) 470 having ten bit positions suitable for storing the ten bits of a trunk code. Also included is a Buffer Channel Store (BCS) 471 including eight bit positions and suitable for storing an identification of one of the 100 transmission channels.

A Buffer Queue Store (BQS) 472 having a one-bit capacity is provided to indicate the latest assignment of each channel at the receiver. A Buffer Status Store (BSS) 473 having a four-bit capacity is also provided. A buffer status encoder 474 converts signals on one output of sixteen input leads 475 into a binary code for storage in store 473. A status decoder 476 translates these binary codes into status signals on output leads 477.

The status codes in store 473 are utilized to indicate which particular function or timing cycle the associated trunk-channel assignment is currently experiencing. These buffer status codes are indicated in Table II.

TABLE II

Buffer Status Codes (BSS)

| Code | Description |
|---|---|
| BSO=AVV | Available Timeslot |
| XAT | Transmitter Auxiliary Gate Timing |
| RAT | Receiver Auxiliary Gate Timing |
| CAT | Channel Auxiliary Gate Timing |
| RDT | Receiver Channel Delay Timing |
| CSA | Repeat Connect Signal for Channel A |
| CSB | Repeat Connect Signal for Channel B |
| CDT | Channel Check Channel Delay Timing |
| CNT | Channel Check Channel Noise Timing |
| RSD | Remote Signal (Print or Data) |
| PSO | Priority Signal (Data) |

A more detailed description of some of these status code and its use in the overall system will be provided hereinafter.

A Buffer Dealy Store (BDS) 478 having eight bits is also provided in the buffer store of FIG. 9. The timing of each of the functions represented by the various status codes in store 473 is accomplished by BDS store 478. For example, to accomplish such timing, a particular code is written into the desired timeslot of BDS store 478. At regular intervals thereafter, this code is decremented by 1 in a decrementing circuit 479 and the decremented number reinserted in the same timeslot in store 478. Commands to decrement a particular code appear on lead 480 synchronized in the timeslot in which the code to be decremented appears. A buffer delay code detector 481 detects particular values of the BDS codes and provides indications thereof on output leads 482. In particular, detector 481 can detect an all-zeros code, indicating that a particular initial value stored in BDS store 478 has been decremented all the way to zero, thus indicating that a corresponding time period has elapsed.

It should be noted that, due to the construction of BDS store 478, each one of 100 different operations can be simultaneously timed merely by assigning them to different timeslots in store 478. That is, 100 different timing codes, all in different timeslots of BDS store 478, can each be decremented separately in its own timeslot by circuit 479. Detector 481 then provides an indication in the appropriate timeslot when the code reaches a desired value (e.g., zero).

Figure 10:
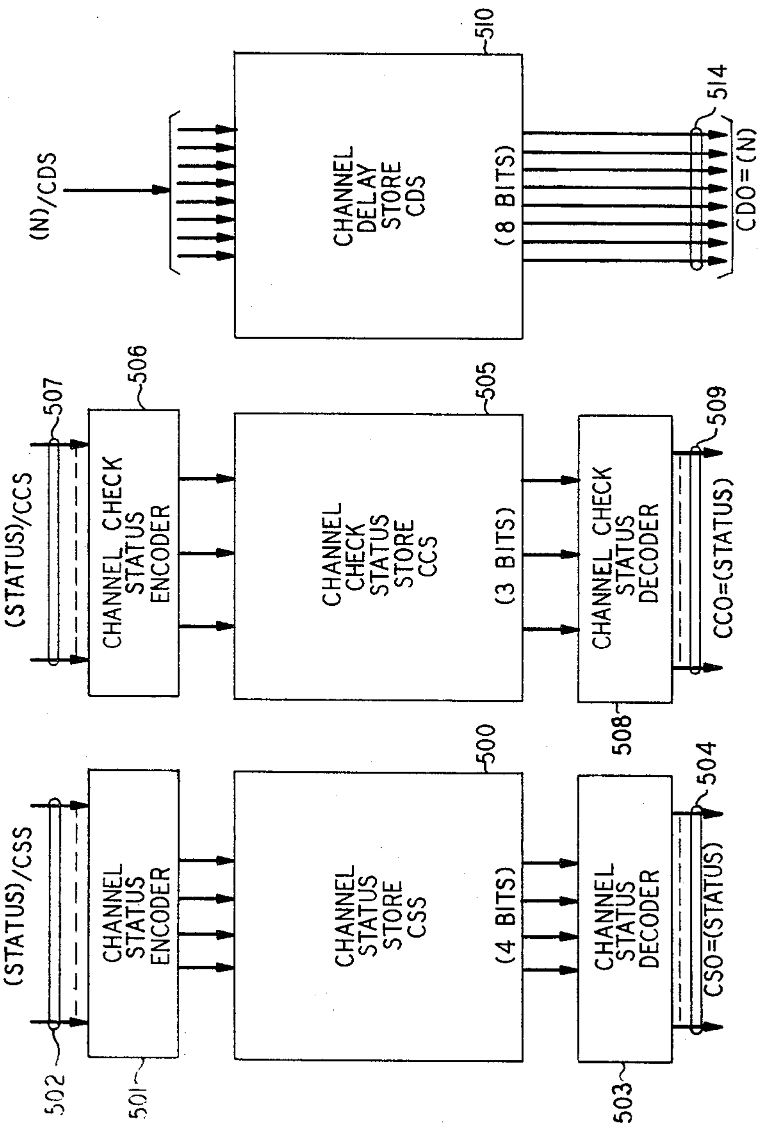
FIG. 10 is a block diagram of the channel stores suitable for use in the interpolation system of FIG. 1.

In FIG. 10 there is shown a block diagram of the channel storage units. Each of these storage units includes 100 stages or timeslots and is used to store information concerning each of the transmission channels of the TASI system of FIG. 1.

A Channel Status Store (CSS) 500, having four bit positions, is utilized to store a coded indication of the current status of each transmission channel. A channel status encoder 501 is utilized to convert status indication commands on sixteen input leads 502 into binary codes for storage in CSS store 500. A channel status decoder 503 reconverts these binary codes into status indicating signals on output leads 504. In Table III there is shown the various channel status codes with a brief description of each.

TABLE III

Channel Status Codes (CSS)

| Code | Description |
|---|---|
| CSO=NOR | Normal |
| MLR | Manual Lockout Request |
| MLI | Manual Lockout in Progress |
| MLO | Manually Locked Out |
| ALR | Automatic Lockout Request |
| ALI | Automatic Lockout in Progress |
| ALO | Automatically Locked Out |
| RCK | Priority Request for Channel Check |
| CLI | Cable Lockout in Progress |
| CLO | Cable Group Locked Out |
| CLR | Cable Lockout Request |
| RLI | Release Lockout in Progress |
| RLR | Release Lockout Request |
| SLI | Satellite Lockout in Progress |
| SLO | Satellite Locked Out |
| SLR | Satellite Lockout Request |

A description of some of these status codes and their use in the system in FIG. 1 will be taken up hereinafter.

A Channel Check Store (CCS) 505 having three bit positions is provided to store code indications of the results (as status codes) of the channel check procedure. In general, this procedure serves to test automatically the condition of each transmission channel on a regularly recurrent basis. A channel check status encoder 506 converts status indicating signals on eight input leads 507 into appropriate binary codes. Similarly, a channel check status detector 508 reconverts these binary codes into status indications on eight output leads 509. The channel check status codes are shown in Table IV.

TABLE IV

Channel Check Codes (CCS)

| Code | Description |
|---|---|
| CCO=OS | Out of Service |
| L1 | Level Greater than 3 db Low |
| L2 | Level Greater than 3 db High |
| N1 | Noisy |
| F1 | Failed Once |
| F2 | Failed Twice |
| LN | Channel Out of Limits, Level and Noise |
| OK | Channel Within Limits |

A detailed description of how this CCS store is updated will be described hereinafter. A Channel Delay Store (CDS) 510 is provided for storing eight-bit codes representing the relative delay time of each transmission channel.

Figure 11:
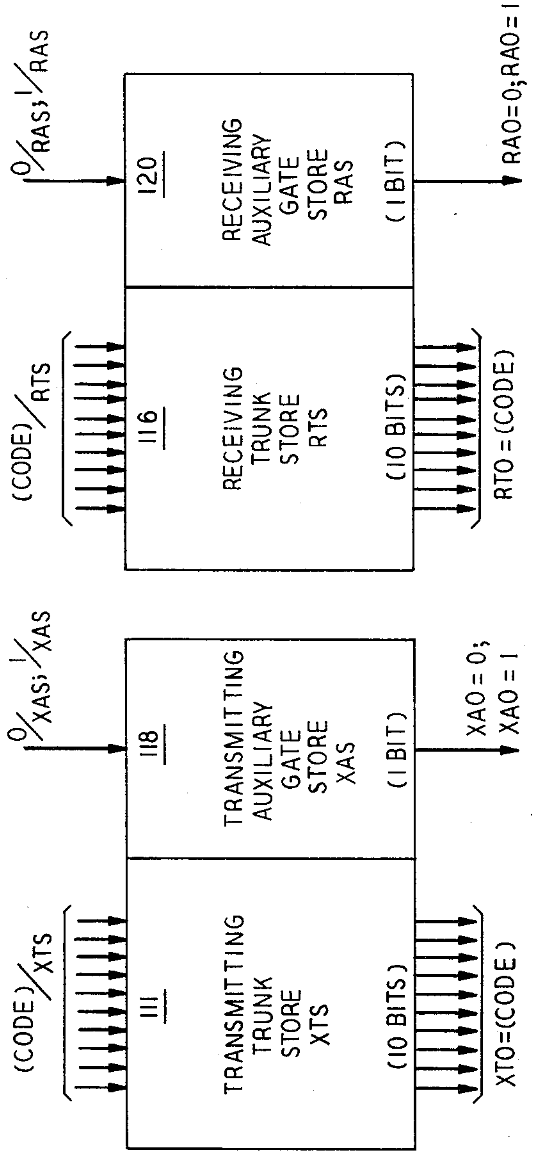
FIG. 11 is a block diagram of the gate stores suitable for use in the interpolation system of FIG. 1.

In FIG. 11 there is shown, for the purposes of completeness, the gate storage units used in the time assignment speech interpolation system of FIG. 1. The transmitting trunk store 111 (which is also shown in FIG. 1) is a ten bit storage device having 100 stages or timeslots and serving to store ten-bit trunk codes. These trunk codes, when applied to the transmitting switch 106 of FIG. 1, serve to connect the identified trunk to that channel whose channel code is generated in the timeslot to which the trunk code appears. Similarly, transmitting auxiliary gate store (XAS) 118 stores a 1 bit in each timeslot for which the corresponding auxiliary gate is to be operated.

In a similar fashion, the receiving trunk store (RTS) 116 also has ten-bit storage positions and stores the trunk codes necessary to operate receiving switch 107 in FIG. 1. The receiving auxiliary gate store (RAS) 120 stores a one-bit code which is used to operate the receiving auxiliary switch 119 in FIG. 1. The operation of these gates may be more readily perceived in considering FIGS. 12 and 13.

The Time Division Switches

Figure 12:
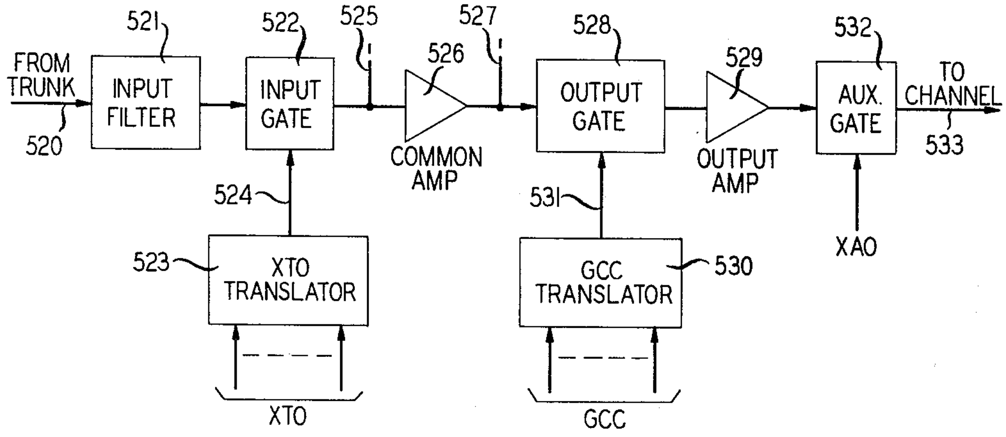
FIG. 12 is a block diagram of the transmitting switch of the interpolation system disclosed in FIG. 1.

In Fig. 12 there is shown a more detailed block diagram of the transmitting switch 106 of FIG. 1. Since the per-trunk and per-channel equipment is identical for each trunk and channel, respectively, only one set of such equipments is illustrated in FIG. 12. Thus, a trunk identified in FIG. 12 by reference numeral 520 is applied to an input filter 521 which serves to limit transmitted signals to the voice band. This signal is applied to an input gate 522 which may comprise any electronic signal gate of sufficient speed and isolation characteristics. Gate 522 is under the control of a translator circuit 523 which translates the binary codes from XTS store 111 (FIG. 11) into a gate enabling signal on lead 524. The output of gate 522 is connected to an input gating bus 525 to which input gates from all of the other trunks are likewise connected.

A common amplifier 526 separates input gating bus 525 from output gating bus 527 in the manner taught in S. C. Kitsopoulos U.S. Pat. No. 3,444,326, granted May 13, 1969. Amplifier 526 serves to rapidly discharge stray capacitances and thus minimizes crosstalk between the successive PAM samples on buses 525 and 527.

An output gate 528, similar to gate 522, connects output bus 527 to an output amplifier 529. Output gates similar to gate 528, one for each of the transmission channels, are also connected to output bus 527. Gate 528 is under the control of a translator circuit 530 which translates the generated channel codes (GCC's) from the circuit of FIG. 2 into a gate enabling signal on lead 531.

The output of amplifier 529 is supplied to auxiliary gate 532 which is under the control of output signals from XAS store 118 in FIG. 11. The output of gate 532 is connected to channel 533.

It can be seen that the transmitting switch in FIG. 12 is a pulse amplitude modulated (PAM), time-division switch which serves to connect pulse samples from trunk 520 to channel 533 by simultaneously operating an input gate 522, an output gate 528, and an auxiliary gate 532 in the same timeslot. Similar connections between other trunks and other channels are accomplished by operating similar sets of gates in different timeslots.

Figure 13:
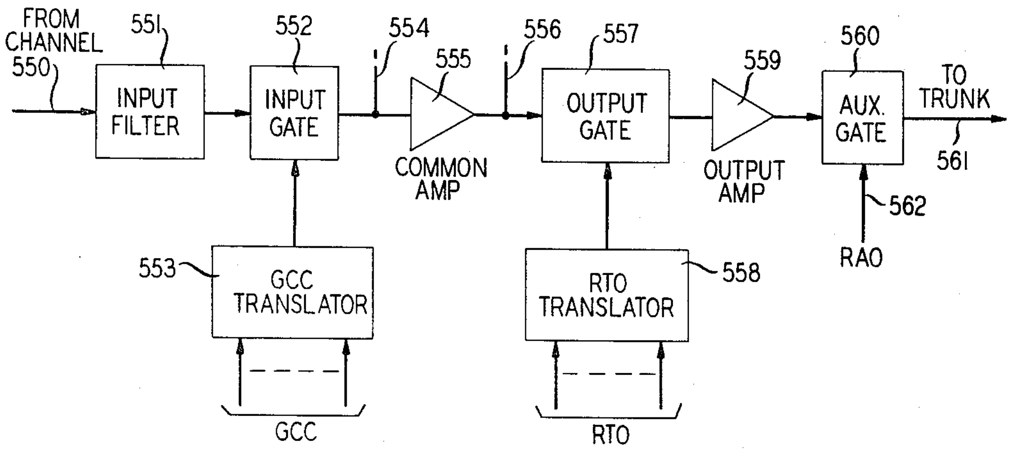
FIG. 13 is a block diagram of the receiving switch of the interpolation system of FIG. 1.

In FIG. 13 there is shown a receiving switch similar to the transmitting switch in FIG. 12 but utilized to connect transmission channels to subscriber trunks at the TASI receiver. Thus, transmission channel 550 is connected by way of an input filter 551 to input gate 552. Input gate 552, under the control of GCC translator 553, connects the output of input filter 551 to input bus 554. Common amplifier 555 connects input bus 554 to output bus 556 and minimizes cross-talk between successive pulse samples.

Output gate 557, under the control of RTO translator 558, connects output bus 556 to output amplifier 559. The output of amplifier 559 is connected by way of auxiliary gate 560 to trunk circuit 561. Gate 560 is under the control of signals on lead 562 from receiving auxiliary gate store (RAS) 120 of FIG. 11.

It is readily apparent that the receiving switch of FIG. 13 operates in a manner identical to the transmitting switch of FIG. 12 and performs the converse function of interconnecting transmission channels to receiving trunks on a time-division basis.

Detailed Description of Channel Check Process

FIGS. 14 through 17 are sequence or flow charts which illustrate in detail the procedure for the channel check function in the Time Assignment Speech Interpolation (TASI) system of FIG. 1. Furthermore, the flow charts of FIGS. 14 through 17 also provide a detailed specification of the logic circuits necessary to implement this procedure. Before proceeding to a detailed description of these flow charts, a brief description of the conventions used is in order.

The basic organization of the flow charts of FIGS. 14 through 17 is to provide a description of the sequence of logical decisions which are necessary to implement the overall channel check procedure in the TASI system of FIG. 1. The sequence of these logical decisions and operations proceeds from the top to the bottom of the flow charts. Each line of the flow chart represents a specific subfunction which is identified with an appropriate text label in the left-hand box of that line. Major timing intervals are disclosed in the next box and correspond to the timing intervals defined in FIGS. 3 and 4 of the drawings. When these timing intervals extend over more than one subfunction box, an arrow is used to indicate the span of subfunctions which take place in the identified timing interval.

The remaining small boxes on each line each represent a single logical decision. The logical conditions which must be met for each logical decision appear as equations or as timing pulse identifications near the top of the box. Logical conditions common to more than one basic logical decision are shown as extending across the top of more than one decision box and separated therefrom by a dashed line.

The action to be taken as a result of all of the logical conditions in a box being met is represented in abbreviated form at the bottom of that decision box. These actions or commands each include a slash ("/") which may generally be read as "into." The meaning thereby intended is that the coded information item identified on the lefthand side of the slash is to be placed into the piece of apparatus identified on the right-hand side of the slash. The symbols "R" and "S" on the left of the slash represent "reset" and "set," respectively, and are applied to flip-flops and registers as shown in FIGS. 5 and 7 of the drawing.

A comma is sometimes used to separate items to which a common command is applied. For example, "R/R5,R6" means to reset registers R5 and R6. Arrows are generally used to show the direction of time flow.

The channel checking operation is under the control of a Channel Check Processing Register (CCPR). The number stored in this register indicates the particular step of the overall function which is currently in progress. When that step is completed, the CCPR is advanced to the next state which is used as a control signal to enable the next step. The steps of the channel check function as represented by the status conditions of the CCPR are shown in Table V.

TABLE V

Channel Check Processing Register (CCPR)

| | |
|---|---|
| CCPR = 0 | Repeat Interval Timing |
| 1 | CSS and XAS Check (Normal Channel Check) |
| 2 | CSS and XAS OK (Disc, Trunk or Update Trunk Busy) |
| 3 | Load Buffer, Update CCC number |
| 4 | Buffer Loaded, — Wait for Aux. Gate Timeout |
| 5 | Silence Timing — Channel Delay Timing |
| 6 | Tone Timing — Level Check |
| 7 | Silence Timing — Noise Check |
| 8 | Wait Interval — Far End Check Completion |
| 9 | CSS not OK ' Update CCC Number |
| 10 | Busy Timeout — Update CCC Number and Log |
| 11 | XAS OK — Priority Channel Check |
| 12 | XAS OK — Disconnect Trunk, Load Buffer |

In summary, a normal channel check is initiated by putting the CCPR into state 1. The number of the channel to be checked, the channel check candidate (CCC), which is stored in the LAS memory 450 in FIG. 8, is acquired and the status of that channel is verified for eligibility. The trunk code of the trunk assigned to that channel is acquired and stored for future use. The CCPR is then updated to state 3 which initiates the signaling itself and increments the channel code stored in LAS memory 450 in preparation for the next cycle of channel checking.

Before channel check signaling is actually permitted, the auxiliary gate corresponding to gate 532 in FIG. 12 is turned off, requiring 4 milliseconds. Then a special channel check code (CKC) is written into the transmitting trunk store (XTS) 111 of FIG. 11. At the same time the auxiliary gate is allowed to turn back on which also takes about 4 milliseconds.

The CCPR is updated to state 4 until the channel check assignment (i.e., the assignment of the test trunk CKC to the channel to be tested) is signaled to the receiver. The connection is then completed at the transmitter and the CCPR is updated to state 5.

During CCPR state 5 a silent interval of 280 milliseconds is timed. During this silent period the channel delay will be measured at the receiver. The CCPR is then updated to state 6 to permit a 40 millisecond burst of 1,800 Hz. tone to be transmitted. After the termination of this tone burst, the CCPR is updated to state 7 and a second silent interval of 240 milliseconds is timed. Finally, the CCPR is updated to state 8 to restore the channel back to normal service and to time a minimum wait interval of 600 milliseconds. The minimum wait interval insures that the receiver processing will be completed before the next channel check is initiated at the transmitter.

The channel is restored to service by replacing the channel check CKC code in XTS store 111 with a priority disconnect code PDC causing an immediate disconnect of the test trunk from the tested channel, as described in the aforementioned R. E. LaMarche et al. application. When this minimum waiting time is completed, the CCPR is updated to state 0 and a repeat waiting time interval is timed out. This interval is selected to allow channel check to proceed through all the channels rapidly enough to detect a failure yet not so fast as to load the system and degrade customer service by excessive checking. The nominal repeat rate is about 2 to 3 seconds. Thus a particular channel is rechecked about every 4 or 5 minutes.

The channel check function may not proceed as smoothly as described above. For example, during status CCPR=1, the channel number of the channel to be checked is stored and the status of that channel investigated; if that channel status indicates that a change of occupant is in progress (XAO ≠ 0), the channel check is aborted for 19.2 milliseconds and then a retry is made for the same channel. If the channel status indicates that the channel is locked out of service, (CCO=0S), then that channel is not a candidate to be checked, and a state of 9 is placed in the CCPR to permit the channel check candidate number (CCC) to be incremented, thus trying the next channel (after 19.2 milliseconds).

If an invalid channel code is received, the channel check candidate number is incremented and a further attempt is made but an alarm is provided to signal attendant personnel of this problem.

If the trunk assigned to the selected channel is not idle, it is observed every 19.2 milliseconds until it becomes idle and then the channel check sequence continues. If the trunk does not become idle within 10 seconds, the CCPR is advanced to state 10, the channel is skipped and an alarm is given to attendant personnel. Since it is unlikely that an uninterrupted talk spurt would continue for this period, it is more likely that some failure has occurred in the speech detector or on the trunk.

If, during the CCPR=4 state, no indication is received that this channel check assignment has been transmitted to the remote receiver, a 10 second timer times out. An alarm is then given to attendant personnel and the CCPR is advanced immediately to state 9 to advance the channel check candidate number and to proceed with other channels.

The priority channel check is quite similar to normal channel check except that it is not necessary to await the completion of the repeat wait timing interval. Requests for priority channel check come from channel status (CSO=RCK) and therefore it is not necessary to check the channel status. Moreover, talker activity is not considered for priority channel check. Only if the channel is in the process of changing its occupant does the priority channel check circuit wait for 19.2 milliseconds (CCPR=11). The remainder of the priority channel check is identical to normal channel checks.

In accordance with the present invention, at the remote terminal of the TASI system the far end receiver 115' (FIG. 1) recognizes the receipt of the channel check code CKC and immediately starts a timing process to determine the channel delay. The transmission level and noise level of the channel under test are also determined and the appropriate stores updated with this information. Significant delay changes or failures in the level or noise tests cause alarms to attendant personnel and request priority rechecks of that channel. These functions are accomplished as follows.

When a CKC trunk code is received as the new connection, it is placed into the channel timeslot of the RTS store 116 (FIG. 11). As at the transmitter, a control register is used at the receiver to control the channel check function. This channel check receiver processing register (CCRR) has the states summarized in Table VI.

TABLE VI

Channel Check Receiver Processing Register (CCRR)

| | |
|---|---|
| CCRR = 0 | Channel Check Iniated |
| 1 | Look for Tone |
| 2 | CDS Update |
| 3 | Level and Noise Check Timing |
| 4 | CCS Update |
| 5 | CCS Update and Signal for Recheck |
| 6 | Level and Noise Check Timing (Delay not OK) |
| 7 | Receiver Channel Check Complete |

A second control register is used at the receiver to keep track of the actual state of the channel currently being tested. A summary of the status conditions of the channel check data register (CCDR) is shown in Table VII.

TABLE VII

Channel Check Data Register (CCDR)

| | |
|---|---|
| CCDR = 0 | Tone not received (Failed Level) |
| 1 | Low Tone Level received (Stop Delay Timing) |
| 2 | Tone Level OK |
| 3 | Tone Level High |
| 4 | Channel Noisy |
| 5 | Channel Noisy and Out of Level Limits |
| 6 | Channel Failed on Noise Test |
| 7 | Do Not Print Test Results |

The buffer store of FIG. 9 is loaded with the channel number of the channel under test, the channel delay timing number for CDT memory store 510 (FIG. 10) and buffer status. The buffer delay store is loaded with a number proportional to the first silent interval adjusted by the transit time for the control channel. In the illustrative embodiment, this number would correspond to the silent interval length of 280 milliseconds minus the minimum signaling delay time of 7 milliseconds. The resulting 273 millisecond code is loaded as a negative number in the buffer delay store and incremented at regular intervals until the test tone is received. The resulting number in the BDS store 478 (FIG. 9) when timing has stopped represents the excess delay of the channel under test over the signaling channel. This new delay number is compared to the old delay number in channel delay store 510 for the same channel and is used to replace the old delay number. If the new delay differs from the old by more than some fixed amount (L) of a few milliseconds, a recheck is requested since a measurement error is likely. At this time, the buffer status is changed from CDT to CNT and tone and noise timing begins. The received tone level is not measured until about 20 milliseconds after the leading edge of the tone burst to permit transients to die out. Noise timing likewise delays noise measurements until well into the second silent interval when the effects of the tone burst have fully dissipated and the background noise level can be accurately recorded. The resulting channel parameters are quantified and stored as states of the CCDR register.

If the channel has failed any of these tests once, a recheck request is signaled back to the transmitter to request a priority recheck of the failed channel. A second failure will initiate an automatic lockout sequence and an alarm to attendant personnel. Various other checks and alarms are also provided.

Figure 14:
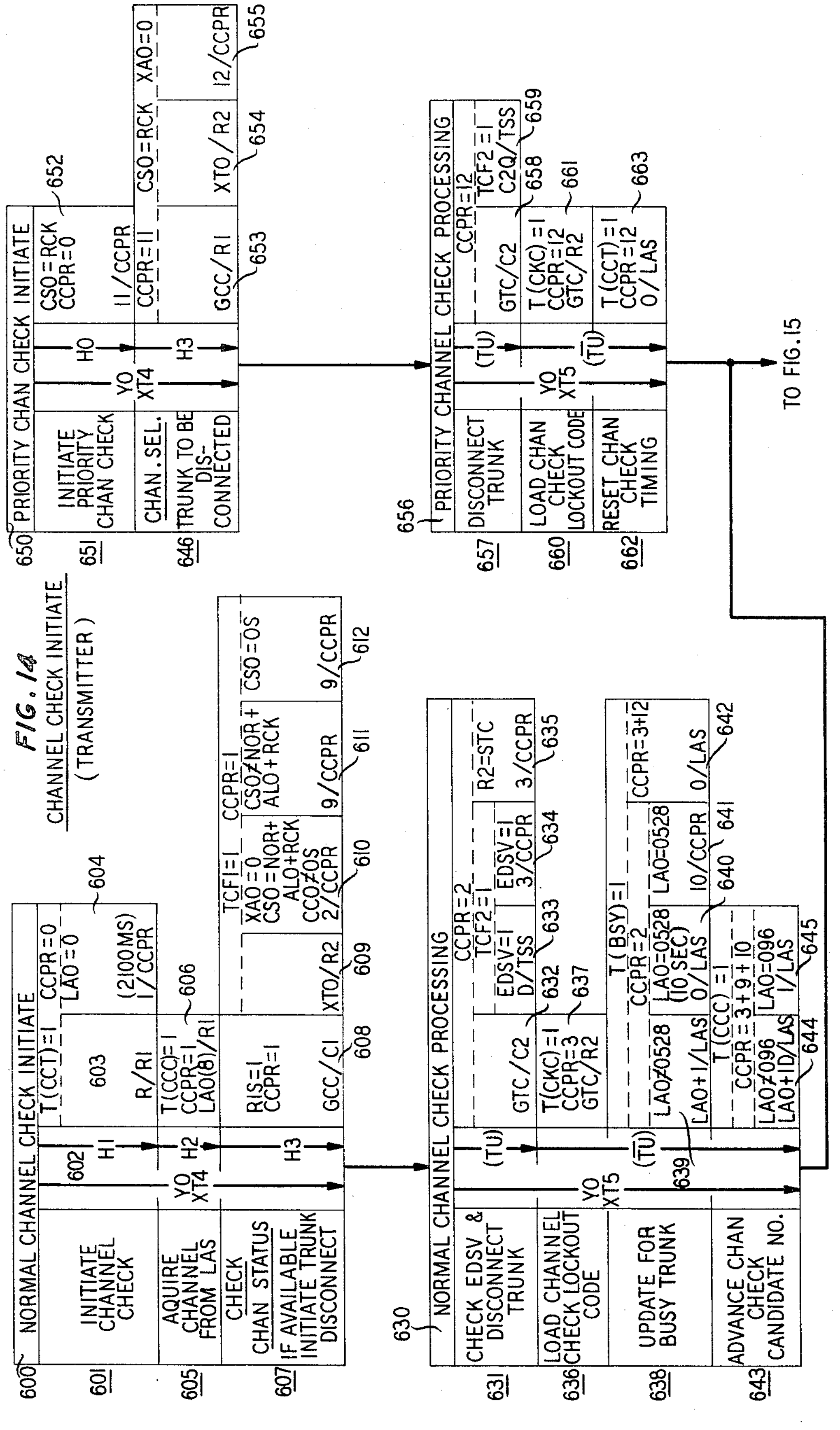
FIG. 14 is a flow or sequence chart of the channel check initiating process used in the transmitter of the interpolation system of FIG. 1.

Turning then to FIG. 14, the flow chart 600 describes the normal channel initiate function as well as the logical circuitry required for this function. The first line 601 of flow chart 600 describes the subfunction of initiating the channel check (INITIATE CHANNEL CHECK). As indicated in box 602, this subfunction takes place during the H1 channel scanning period of the XT4 trunk scanning period. The YO timing pulse exists for 2.4 milliseconds every 19.2 milliseconds and thus selects every eighth connect signaling period as a channel check initiation period. These pulses serve to synchronize the overall channel check function.

Each of the decision boxes in FIGS. 14 through 17 correspond to a single logical gate and thus these figures, in addition to providing a functional flow chart of the operation of the system, also provide a detailed specification of the logic circuit necessary to implement these functions.

Channel checking is initiated when the state of the CCPR register is zero (CCPR=0), indicating that repeat wait timing is taking place and during the timeslot assigned to channel check timing (timeslot CCT) in the LAS store 450 (FIG. 8) (T(CCT) =1). These two conditions are therefore included in a box subtending decision boxes 603 and 604 in FIG. 14. In decision box 603 the R1 storage register (FIG. 5) is reset to the all zeros condition (R/R1). In decision box 604, the CCPR register is advanced to state 1 (1/CCPR) if the timing code in the LAS store 450 is zero (LAO=0) indicating the elapse of approximately 2,100 milliseconds since the last channel check was signaled to the remote receiver.

At line 605 of FIG. 14 the subfunction of acquiring the channel number of the next channel to be checked from the LAS store 450 (FIG. 8) is done during the H2 channel scanning period in the channel timeslot, T(CCC), corresponding to the storage location of the next channel check candidate code. Thus the lower order 8-bits in the CCC timeslot of the LAS store are written into the R1 storage register (LAO(8)/R1) when the CCPR is in the 1 state (CCPR=1) and when the CCC timeslot is available (T(CCC)=1) in decision box 606.

At line 607 various checks are made of the channel status of the selected channel to determine if that channel is available for channel checking purposes. This takes place during the H3 channel scanning period. In decision box 608 the selected channel code in the R1 register is compared to the generated channel codes (GCC/C1) provided the status of the R1 register indicates a channel code has been stored (R1S=1) and providing the CCPR register is still in the 1 state (CCPR=1). When this comparison indicates a match of codes, a timeslotted pulse is generated (TCF1=1). This condition, along with the continuation of the (CCPR=1) condition, permits the test indicated in boxes 609, 610, 611 and 612 to take place.

In box 609 the identity of the assigned trunk in XTS 111 (FIG. 11) is written into the R2 storage register (XT0/R2). In decision box 610 the CCPR is advanced to state 2 (2/CCPR) provided the channel is not out of service (CCO ≠ 0S); a new connection is not in progress as indicated by the opening of auxiliary gate (XAO=0); and further provided the channel status is either normal (CSO=NOR), automatically locked out (CSO=ALO) or the channel is marked for priority check (CSO=RCK).

In decision box 611 the CCPR is advanced to state 9 (9/CCPR) if the selected channel is not normal or automatically locked out or marked for priority recheck (CSO ≠ NOR+ALO+RCK). As will be seen, state 9 of the CCPR causes the channel number in LAS timeslot CCC to be advanced and thus skips checking the current channel. For similar reasons, in box 612 the CCPR is advanced to state 9 (9/CCPR) if the currently selected channel is out of service (CSO=0S).

Figure 15:
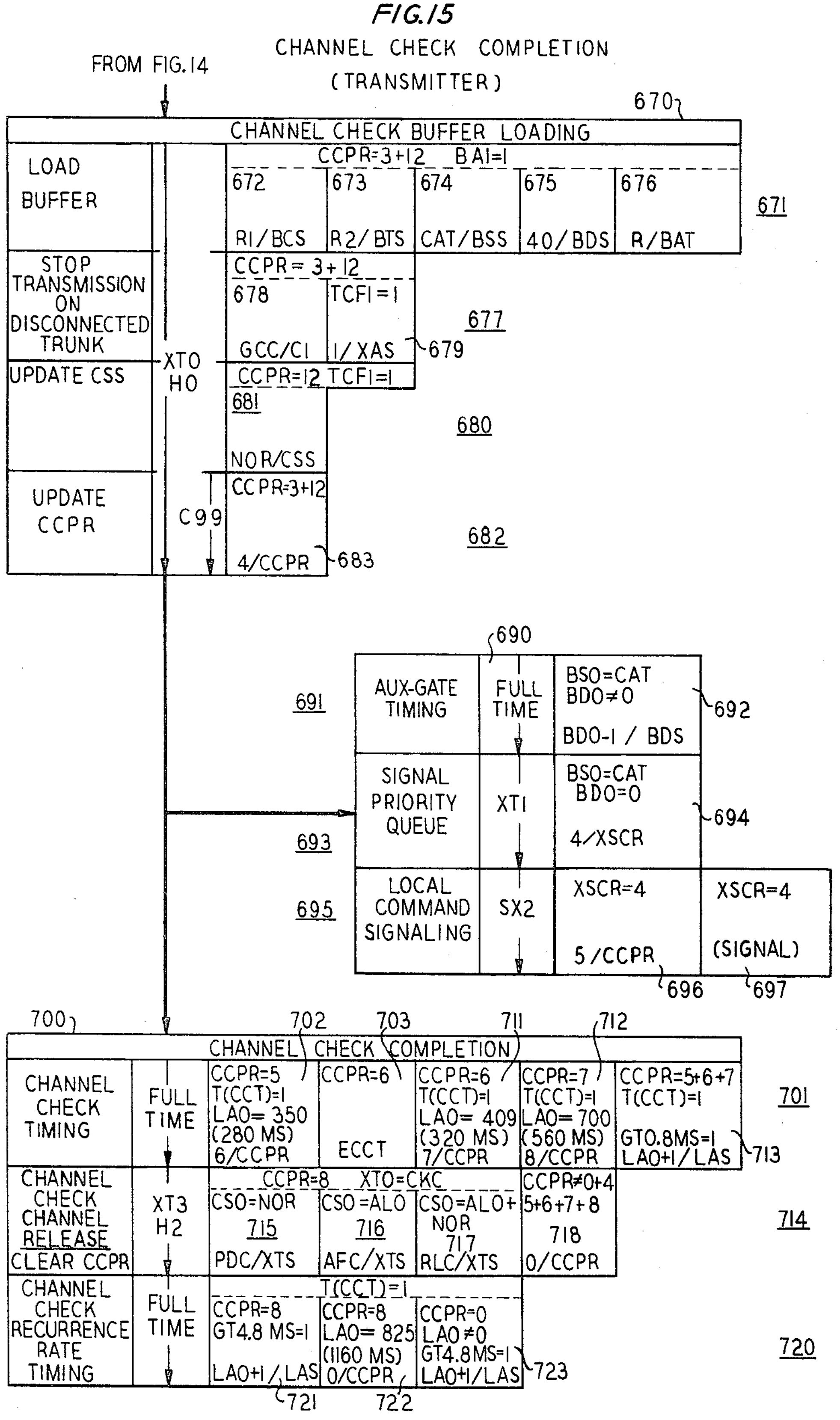
FIG. 15 is a flow or sequence chart of the channel check completion process used in the transmitter of the interpolation system of FIG. 1.
Figure 16:
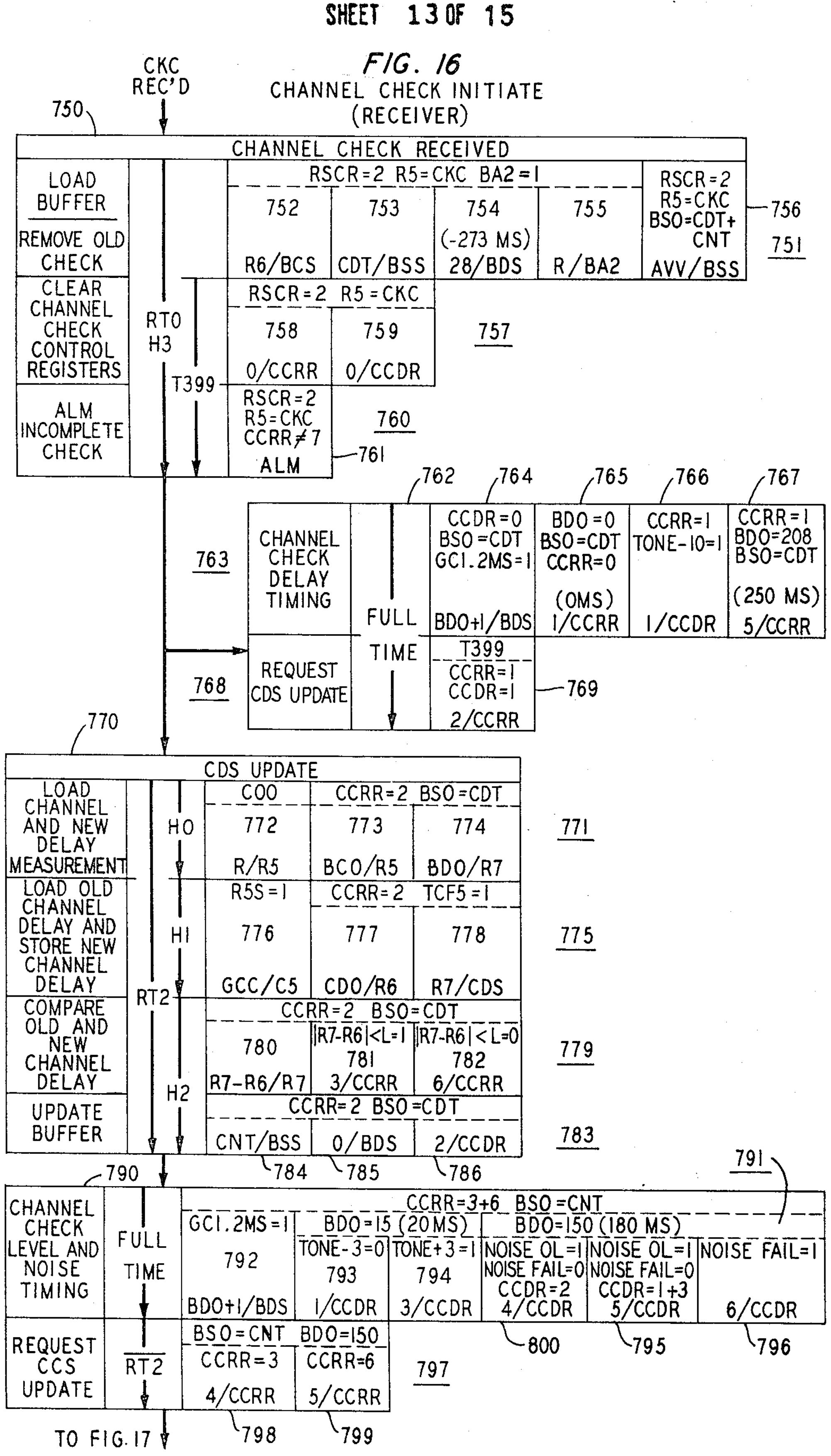
FIG. 16 is a flow or sequence chart of the channel check initiating process used at the receiver of the interpolation system of FIG. 1.
Figures 17, 18:
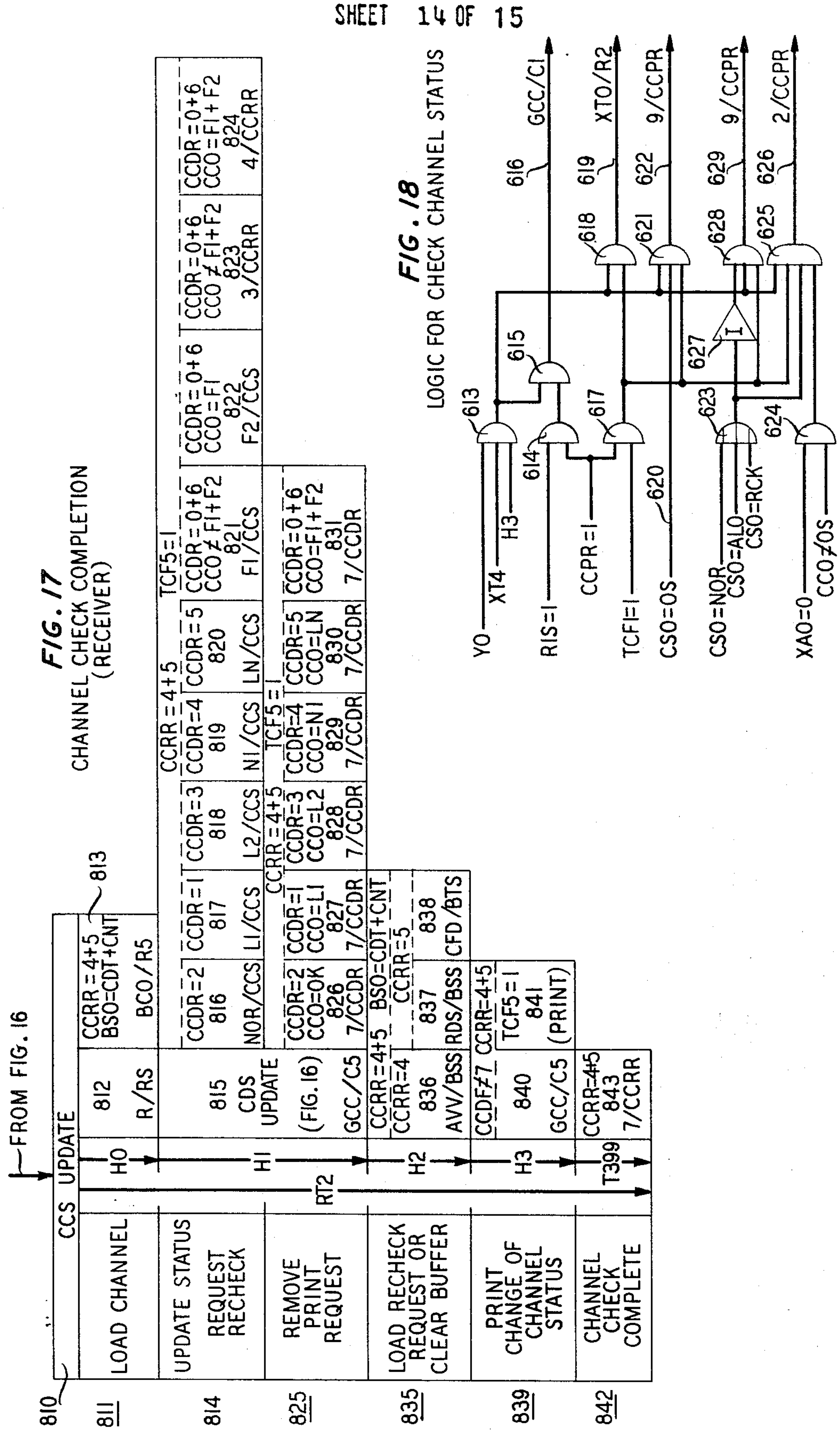
FIG. 17 is a flow or sequence chart of the channel check completion process used at the receiver of the interpolation system of FIG. 1.
FIG. 18 is a schematic circuit diagram of the detailed logic of the check channel status function of the flow chart of FIG. 14.

To illustrate the exact equivalency between the decision boxes of FIGS. 14 through 17 and the implementing logic, the subfunction on line 607 will be illustrated in precise detail by a logic circuit shown in FIG. 18. Thus, in FIG. 18 the logic for checking channel status is shown in detail. In FIG. 18 the Y0, XT4 and H3 timing pulses are combined in AND gate 613 and utilized to time all of the functions shown in FIG. 18. The status of the R1 register (R1S=1) and the 1 state of the CCPR (CCPR=1) are combined in AND gate 614. The outputs of gates 613 and 614 are combined in AND gate 615 to provide a signal on lead 616 to compare the generated channel codes with the contents of the R1 register (GCC/C1). This corresponds to the decision box 608 in FIG. 14.

The compare pulse from the R1 compare circuit (TCF1=1) and the status of the CCPR register (CCPR=1) are combined in AND gate 617 to provide the control signal subtending decision boxes 609 through 612 in FIG. 14.

The output of gate 617 is combined with the output of gate 613 in AND gate 618 to provide the control signal on lead 619 which writes the contents of that timeslot of the XTS store 111 (FIG. 11) into the R2 storage register (XT0/R2). This corresponds to decision box 609.

The output of gate 617 and the output of gate 613 are combined with a signal on lead 620 indicating that the selected channel is out of service (CSO=0S) in AND gate 621 to provide an output on lead 622 to advance the CCPR state to 9 (9/CCPR). This corresponds to decision box 612 in FIG. 14.

An OR gate 623 combines three possible status signals from the channel status store 500 (FIG. 10) to provide an indication that the status of the selected channel is either normal (CSO=NOR), automatically locked out (CSO=ALO) or marked for priority channel check (CSO=RCK). AND gate 624 is provided to combine an indication that a change in assignment is not in progress (XAO=O) with an indication that the channel selected is not out of service (CCO ≠ OS). Note that the latter input to gate 624 is simply the inverse of the signal on lead 620. The outputs of gates 613, 617, 623 and 624 are all combined in AND gate 625 to provide an output on lead 626 which advances the state of the CCPR to 2 (2/CCPR). This corresponds to decision box 610 in FIG. 14.

The output of OR gate 623 is inverted in inverter circuit 627 and combined in AND gate 628 with the outputs from gates 613 and 617 to provide a signal on lead 629 to advance the CCPR to state 9 (9/CCPR). This corresponds to decision box 611 in FIG. 14.

It can be seen that implementation of all of the logic for the flow charts in FIGS. 14 through 17 is a straightforward implementation of logical AND and OR gates made obvious by the logic equations in each of the decision boxes. Rather than disclosing all of this logic in detail, only FIG. 18 has been provided to indicate the manner of such implementation. All of the other decision boxes shown in FIGS. 14 through 17 may be realized in precisely the same fashion as shown in FIG. 18.

Returning to FIG. 14, flow chart 630 describes the function of normal channel check processing. At line 631, the trunk assigned to the selected channel is checked for its service status during the XT5 trunk scanning period of the YO timing pulse. The $\overline{TU}$ interval of this period corresponds to all the timeslots actually assigned to real telephone trunks. The remainder of the timeslots ($\overline{TU}$) correspond to timeslots not used or to trunks used for special purposes such as trunk 339, which is the source of the channel check tone signal. In box 632 the generated trunk codes are compared to the trunk code stored in the R2 storage register (GTC/C2) provided the CCPR is in the 2 state (CCPR=2).

When a match occurs in response to this comparison, a compare signal is generated (TCF2=1). In decision box 633 the speed detector output for this trunk is checked to determine that it does not need service (EDSV=1) and a disconnect status is written into trunk status store 451 in FIG. 8 (D/TSS). In box 634 the CCPR is advanced to state 3 (3/CCPR).

It will be noted that if the connected trunk is actually requesting service (EDSV≠1), the state of the CCPR is not advanced and an attempt will be made to check this same channel during the next YO time period (in 19.2 milliseconds).

If the trunk code in the R2 register contains the special trunk code STC, indicating that the channel is not actually in use, the activity status of the trunk need not be checked and in box 635 the state of the CCPR is advanced (3/CCPR) independent of activity in that trunk.

During the remainder of the XTS trunk scanning period ($\overline{TU}$) the bookkeeping is done for each attempt to initiate normal channel check. Thus, at line 636 the channel check lockout code CKC is loaded into R2 storage register. This is accomplished in box 637 during the CKC timeslot (T(CKC)=1), provided the CCPR is in state 3 (CCPR=3). The corresponding CKC code assigned to that timeslot is loaded in the R2 storage register (CKC/R2).

At line 638 the updating is done for busy trunks. During the timeslot assigned to busy trunk timeout (T(BSY)=1), if the CCPR is still in the 2 state (CCPR=2), the timing code in that timeslot is advanced (LAO+1/LAS) provided, of course, this timing number has not already timed out (LAO ≠ 528). After 528 consecutive attempts to disconnect this trunk (LAO=528) a period of approximately ten seconds has elapsed. In box 640 the timing code is erased (0/LAS) and in box 641 the CCPR state is advanced to 10 (10/CCPR). This 10 state of the CCPR will be used as described below to signal the attendant personnel that a hangup on the trunk is likely due to the long active indication. In box 642 the timing code in the LAS store 450 (FIG. 8) is set to zero (0/LAS) if the CCPR state has been advanced to 3 or 12 (CCPR=3+12) indicating that the trunk has become idle or has been selected for priority channel check.

At line 643 the channel check candidate number is advanced during the channel check candidate timeslot (T(CCC)=1) if the CCPR is in state 3, 9 or 10 (CCPR=3+9+10). In decision box 644, so long as the channel check candidate number is less than 96 (LAO ≠96), the channel check candidate number is advanced (LAO+1/LAS). In decision box 645, if the channel check number has reached 96 (LAO=96), the channel check candidate number is recycled to 1 (1/LAS).

Function 650 is the priority channel check initiate function corresponding to normal channel check function 600 but for priority situations. At line 651 the priority channel check is initiated during the H0 channel scan period of the XT4 trunk scanning period during the YO timing pulse. In decision box 652 the 11 state is loaded into the CCPR (11/CCPR) if the CCPR was in the zero state (CCPR=0), indicating repeat wait timing, and the special priority channel check status is in the channel status store 500 in FIG. 10 (CSO=RCK). It will be noted that since priority channel check is initiated in response to a channel status code, it is not necessary to investigate channel status further. Priority channel check can thus be requested simply by loading the RCK status into channel status store (CSS) 500 in FIG. 10.

At line 646, during the H3 channel scanning period, provided the CCPR is in state 11 (CCPR=11), the channel status code is still RCK (CSO=RCK), and provided a new connection is not being processed, as indicated by the state of the transmitting auxiliary gate store 118 in FIG. 11 (XAO=0), the connected trunk is determined for disconnection. In decision box 653, the generated channel code in the timeslot (CSO=RCK) in which the RCK status appears (the prior check channel candidate) is loaded into storage register R1 (GCC/R1). In decision box 654 the contents of the transmitting trunk store (XTS) 111 in FIG. 11 is loaded into the R2 storage register (XTO/R2). This is the code of the trunk assigned to the priority check channel candidate. In decision box 655 the state of the CCPR is advanced to 12 (12/CCPR).

Flow chart 656 describes the priority channel check processing. At line 657, during the XT5 trunk scanning period of the Y0 timing pulse, the trunk assigned to the priority check channel candidate is disconnected. In decision box 658, if the CCPR is in the 12 state (CCPR=12), the generated trunk codes are compared to the assigned trunk code in storage register R2 (GTC/C2). In decision box 659, when a match occurs (TCF2=1), the status of that trunk is immediately set to the second connect queue (C2Q/TSS). As previously described in the aforementioned copending application of R. E. LaMarche et al., this trunk status serves to initiate a rapid reconnect of the trunk having that status.

At line 660 the channel check lockout code (CKC) corresponding to the test tone source (trunk 339) is loaded into the R2 storage register. Thus, in decision box 661, during the timeslot assigned to the channel check lockout code (T(CKC)=1), provided the CCPR is still in state 12 (CCPR=12), the appropriate generated trunk code is loaded into the R2 storage register (GTC/R2). At line 662 the channel check timing is reset. Thus, in box 663, during the channel check timing timeslot of the LAS store 450 of FIG. 8 (I(CCT)=1), and provided the CCPR is still in the 12 state (CCPR=12), the timing code in the LAS is reset to zero (0/LAS).

Note that priority channel check candidate selection always takes place in trunk scanning period H0 (line 651 of FIG. 14) before normal channel check candidate selection in trunk scanning period H1 (line 601).

Following normal channel check initiation in flow chart 600 and normal channel check processing in flow chart 630, it is necessary to load the channel check candidate code and the test tone trunk code into the buffer stores in preparation for the transmission of these codes to the remote terminal. Similarly, following priority channel check initiation in flow chart 650 and priority channel check processing in flow chart 656, it is also necessary to load the channel check candidate code and the test tone trunk code into the buffer registers of FIG. 9. Thus normal and priority channel checking follow identical paths once the initiation steps illustrated in FIG. 14 are completed. This buffer loading sequence used by both normal and priority channel check is shown in FIG. 15.

Turning then to FIG. 15, there is shown a flow chart 670 of the channel check buffer loading function. At line 671, the buffer is loaded provided the CCPR is in state 3 (normal channel check) or 12 (priority channel check), i.e., (CCPR=3+12), during the HO channel scanning period of the XTO trunk scanning period, and also provided that the buffer access flip-flop is in the set condition (BA1=1). Thus in decision box 672 the contents of the R1 storage register, i.e., the code of the channel check candidate, is loaded into the buffer channel store (BCS) 471 in FIG. 9 (R1/BCS). In decision box 673 the channel check trunk code CKC stored in storage register R2 is located into buffer trunk store (BTS) 470 of FIG. 9. In decision box 674 the channel auxiliary gate timing status code is loaded into the buffer status store (BSS) 473 of FIG. 9 (CAT/BSS). In decision box 675 the timing code "40" (to provide a 4 millisecond auxiliary gate timing) is loaded into the buffer delay store (BDS) 478 of FIG. 9 (40/BDS). In decision box 676 the buffer access flip-flop is reset (R/BA1) to prevent the loading of these codes into another timeslot of the buffer stores.

At line 677 transmission is terminated on the disconnected trunk. This is accomplished for both normal or priority channel check (CCPR=3+12) by comparing, in decision box 678, the generated channel codes with the selected channel check candidate in storage register R1 (GCC/C1). In decision box 679 the compare signal (TCF1=1) is used to load a 1 into the transmitting auxiliary gate store (XAS) 118 (1/XAS). This code releases the auxiliary gate to terminate the connection of the working trunk as shown in FIG. 12 and described in the aforementioned application of R. E. LaMarche et al.

At line 680 the channel status store (CSS) 500 in FIG. 10 is updated during the same channel check candidate timeslot (TCF1=1) for priority channel checks (CCPR=12). Thus in box 681 the status of the selected channel is changed from RCK to normal (NOR/CSS) to prevent future selections of this channel as a priority channel check candidate. At line 682 and CCPR is updated in decision box 683 during the final channel timeslot (C99). Thus in box 683, if the state of the CCPR is 3 or 12 (CCPR=3+12), the state of the CCPR is advanced to 4 (4/CCPR).

In flow chart 690 the sequence necessary to control the actual signaling of the channel check connection is illustrated. These procedures are described in greater detail in the aforementioned copending application of R. E. LaMarche et al. Thus at line 691, auxiliary gate timing is controlled. In decision box 692, if the buffer status code indicates auxiliary gate timing (BSO=CAT) and if the auxiliary gate timing code has not been decremented to zero (BDO ≠ 0), then the auxiliary gate timing code is decremented by the decrementing circuit 479 in FIG. 9 (BDO − 1/BDS). Here full time means every time this logical combination occurs, in this case every 0.1 milliseconds.

At line 693, following auxiliary gate timeout (BDO=0) provided the buffer status still indicates auxiliary gate timing (BSO=CAT), the transmitting signaling control register (XSCR) is advanced to the state causing transmission of the trunk channel assignment (4/XSCR), all as disclosed in detail in the R. E. LaMarche et al. application. In line 695 the actual signaling takes place. In decision box 696 the state of the CCPR is advanced (5/CCPR) and in decision box 697 the actual signaling of the assignment of the channel check candidate to the test tone trunk takes place as described in the LaMarche application. This assignment, when received at the remote receiving terminal, initiates the channel checking process at the receiving terminal.

Flow chart 700 illustrates the final steps of channel check completion at the transmitting terminal. Thus, at line 701, the timing of the channel check tone transmission is carried out. In decision box 702 the initial silent interval is timed. Provided the CCPR is in the 5 state (CCPR=5) and during the channel check timing timeslot of the LAS store 450 (T(CCT)=1), the CCPR is advanced to state 6 (6/CCPR) when the timing code reaches a value of 350 (LAO=350). This timing number corresponds to the initial silent interval of 280 milliseconds. In decision box 703 the actual channel tone is enabled (ECCT) during state 6 of the CCPR (CCPR=6). This procedure is better shown in the channel check tone circuits of FIG. 19.

Figure 19:
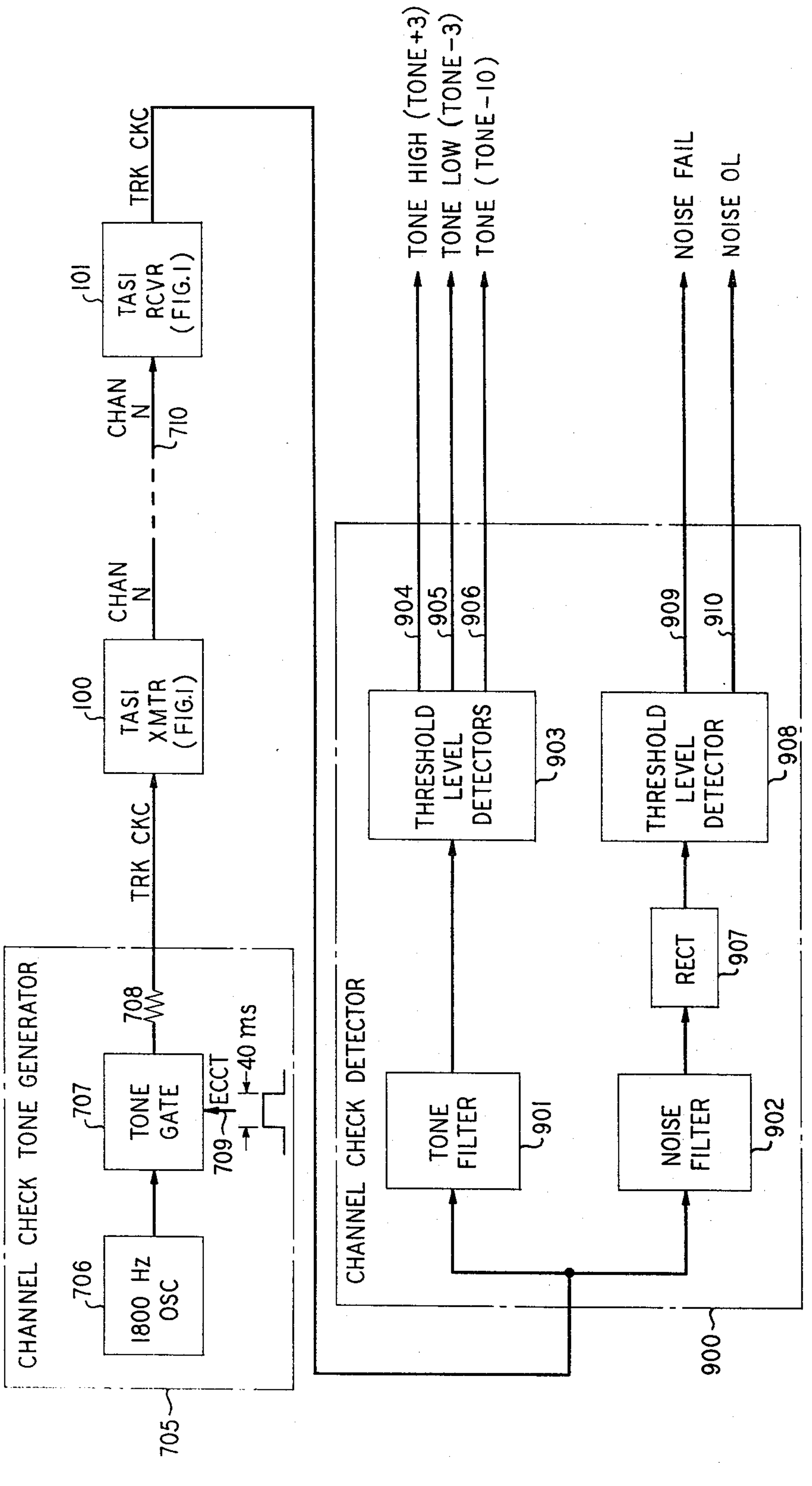
FIG. 19 is a schematic block diagram of the tone generation and detection circuits used for the channel checking system.

Turning for the moment to FIG. 19, there is shown a detailed schematic diagram of the channel check tone circuits for both the transmitting terminal and the receiving terminal of the TASI system. The channel check tone trunk identified as trunk CKC has connected thereto a tone generator 705 including a tone oscillator 706 which produces an 1800 hertz tone. A tone gate 707 gates the oscillator 706 onto trunk CKC through a buffer resistor 708 for the desired period of time. The ECCT control signal on lead 709 provides this control of gate 707 and is derived from decision box 703 of FIG. 15. The initial silent interval, the tone burst and the final silent interval are all transmitted by way of trunk CKC, through the TASI transmitter 100 (FIG. 1) over the channel check candidate 710, through the TASI receiver 101 (also illustrated in FIG. 1), to the receiving trunk CKC. The channel check tone detection circuits for the test tones will be discussed hereinafter.

Returning to FIG. 15, in decision box 711 the timing for the test tone takes place. Thus during the 6 state of the CCPR (CCPR=6), and during the channel check timing timeslot (T(CCT)=1), the CCPR is advanced to state 7 (7/CCPR) when the timing code reaches 409 (LAO=409). This corresponds to a total elapsed time of 320 milliseconds and a tone burst duration of 40 milliseconds. In decision box 712 the final silent interval timeout takes place, provided the CCPR is in state 7 (CCPR=7) and during the channel check timing timeslot (T(CCT)=1). The CCPR is advanced to state 8 (8/CCPR) when the timing code reaches 700 (LAO=700). This corresponds to a total elapsed timing period of 560 milliseconds and a final silent interval of 240 milliseconds. In decision box 713, the channel check timing code is advanced for all of these intervals during states 5, 6 and 7 of the CCPR (CCPR=5+6+7) and during the channel check timing timeslot (T(CCT)=1). The timing code is advanced (LAO+1-/LAS) every 0.8 milliseconds (GTO.8MS=1). The granularity of the timing code advancement is selected to produce the desired timing periods with the selected timing codes.

At line 714 the channel check candidate is released. This takes place when the CCPR is in state 8

(CCPR=8) and the transmitting trunk store (XTS) 111 (FIG. 11) contains the channel check trunk code (XTO=CKC). Under these conditions, in decision box 715, provided the channel status is normal (CSO=NOR), the priority disconnect code PDC is loaded into the transmitting trunk store (XTS) 111 in FIG. 11 (PDC/XTS). As disclosed in the aforementioned application of R. E. LaMarche et al., this priority disconnect code restores the channel check candidate to service as quickly as possible. In decision box 716, if the channel status indicates that the channel is an automatically locked out channel (CSO=ALO), the automatic failure code AFC is written into the transmitting trunk store (AFC/XTS) to indicate that this is a locked out channel. For any other channel status condition (CSO ≠ ALO+NOR) in decision box 717, the release lockout code RLC is loaded into the transmitting trunk store (RLC/XTS) to prevent a talker from seizing the channel (see Table III). In decision box 718 the state of the CCPR is reset to 0 if it is in any state but the 0, 4, 5, 6, 7 or 8 state (CCPR ≠ 0+4+5+6+7+8). This clears CCPR if partial processing occurred (e.g., talker busy).

At line 720 the channel check recurrence rate timing takes place in the channel check timing timeslot (T(CCT)=1). If the CCPR is in the 8 state (CCPR=8), the timing code in the LAS store 450 of FIG. 11 is advanced (LAO+1/LAS) with a granularity of 4.8 milliseconds (GT4.8MS=1) in decision box 721. In decision box 722 timeout occurs when the CCPR is in the 8 state (CCPR=8) and when the timing code in the LAS store 450 equals 825 (LAO=825), corresponding to 1160 milliseconds, the minimum waiting period. At this time, the CCPR is reset to the 0 state (0/CCPR). A new priority check could now begin. In decision box 723 the repeat wait timing takes place. Thus, when the CCPR is in the 0 state (CCPR=0) and provided the LAS store 450 has not recycled to 0 (LAO  0), then the timing code is advanced (LAO+1/LAS) with a 4.8 millisecond granularity (GT4.8MS=1). As previously noted in connection with FIG. 14, only after a timeout of this repeat wait timing period can another normal channel check cycle be initiated. The reset at decision box 718 permits the channel check function to try again with the same channel if interrupted as noted above.

FIGS. 14 and 15 together complete the description of the channel check function at the transmitter. It can be seen that the channel check candidates are selected one at a time in sequence, the connected trunk disconnected and the channel candidate assigned to the channel check test tone trunk CKC. After this assignment has been signaled to the remote receiver, an initial silent interval of 280 milliseconds is placed on that channel, followed by a 40 millisecond burst of 1800 hertz tone, in turn followed by a 240 millisecond silent interval. The use of these signals at the receiving terminal will be described in connection with FIGS. 16 and 17.

In FIG. 16 there is shown the flow chart for channel check initiate function at the TASI receiving terminal. Channel check is initiated at the receiver when the channel check code (CKC) is received and placed in the receiving trunk store (RTS) 116. This is accomplished as described in detail in the aforementioned copending application of R. E. LaMarche et al.

Flow chart 750 performs the function of receiving the channel check candidate identification signals. At line 751, during the H3 channel scanning period of the RTO trunk scanning interval, the code receiving registers are loaded into the buffer stores of FIG. 9. As previously noted, the channel check receiver operation is under the control of a channel check receiver processing register (CCRR). The overall signal receiving function, on the other hand, is under the control of the receiving signal control register (RSCR).

At line 751 it is assumed that the channel code is in the R6 storage register and the CKC trunk code is in the R5 storage register. Thus, at line 751, decision boxes 752, 753, 754 and 755 are subtended by the logical requirements that the receiving signal control register RSCR be in state 2 (a new connection) (RSCR=2), the channel check trunk code RCK be in storage register R5 (R5=CKC) and the buffer access flip-flop BA2 be in the 1 state (BA2=1), indicating the availability of a buffer store timeslot.

In decision box 752 the channel check candidate code in the R6 storage register is loaded into the buffer channel store (BCS) 471 of FIG. 9 (R6/BCS). In decision box 753 the channel status CDT for channel delay timing is loaded into the buffer status store (BSS) 473 of FIG. 9 (CDT/BSO). In decision box 754 a timing number corresponding to −273 milliseconds is loaded into the buffer delay store (BDS) 478 of FIG. 9 (28/BDS). This 273 milliseconds is the minimum delay before the channel check tone burst is received, considering the 280 millisecond silent interval and allowing for a 7 millisecond transit time for the assignment signals themselves. When this number is counted down to zero, the delay number corresponds to the fastest channel, which channel has, for obvious reasons, been selected as the signaling channel. Further incrementations beyond zero provide a measure of the relative delay of the channel under test to the signaling channel. It is this number which is used in accordance with the invention of the aforementioned R. E. LaMarche et al. application in setting up connections without overlap or misdelivery of information signals.

In decision box 755 the buffer access flip-flop BA2 is reset (R/BA2) to prevent the entry of this trunk-channel assignment into any other timeslots of the buffer stores. In decision box 756, provided the RSCR is in state 2 (RSCR=2), the R5 resistor contains the channel check code (R5=CKC), and assuming buffer status store (BSS) 473 (FIG. 9) contains a status indicating either channel delay timing (CDT) or channel noise timing (BSO=CDT+CNT), then the available status (AVV) is placed in the buffer status store (AVV/BSS). This removes any other channel check operations in progress or partially completed since they are error conditions. Only one channel check takes place at a time.

At line 757 the channel check control registers are reset during the last trunk timeslot (T399). Thus in decision box 758 a 0 is set into the channel check receiving register (0/CCRR) and in decision box 759 the channel check data register is reset (0/CCDR). At line 760 an alarm is provided in decision box 761 to attendant personnel if the CCRR was not already in state 7 (CCRR  7) indicating that the previous cycle of receiver channel checking was not completed.

The channel check delay timing takes place in flow chart 762. At line 763, channel check delay timing is advanced (BDO+1/BDS) in decision box 764 provided the CCDR is in state 0 (CCDR=0) and the buffer status store (BSS) 473 (FIG. 9) indicates channel delay timing (BSO=CDT). Incrementing the channel delay timing number takes place with a granularity of 1.2 milliseconds (GC1.2MS=1).

The countdown in the BDS continues until the tone burst is received or until sufficient time has elapsed that no tone is going to be received. In decision box 765 the CCRR is advanced to the 1 state (1/CCRR) when the countdown reaches 0 (BDO=0), provided the buffer status store is marked for channel delay time (BSO=CDT) and provided the CCDR is in the 0 state (CCDR=0). In decision box 766 the tone burst is looked for, providing the CCRR has been advanced to the 1 state (CCRR=1) and providing the received tone level is detected at (or greater than) the −10 dB level (TONE−10=1). The channel check data register (CCDR) is then set to the 1 state (1/CCDR) to stop timing.

In decision box 767 a time-out occurs if the CCRR remains in the 1 state (CCRR=1), and the buffer delay store count exceeds the maximum expected delay (BDO=208), and provided the buffer status still indicates channel delay timing (BSO=CDT). If all these conditions hold, a 5 is placed in the CCRR (5/CCRR) to indicate that the channel has failed the level test, no channel delay measurement is possible, and a recheck is necessary.

At line 768 a request for channel delay store (CDS) 510 (FIG. 10) updating is initiated during the T399 trunk timeslot. In decision box 769 the CCRR is advanced to the 2 state (CDS Update request) if the CCRR is still 1 (looking for tone) and the CCDR is 1 (tone received, but low), to permit utilization of the new delay information even if the tone level is out of limits.

Flow chart 770 is a flow chart of the channel delay store (CDS) 510 update function which takes place during the RT2 trunk scanning interval. At line 771, during the HO channel scanning period, the channel candidate number and delay measurements are loaded into storage registers. In decision box 772, during the first (COO) channel timeslot, storage register R5 is reset (R/R5). If the CCRR is in the 2 state (CCRR=2), indicating the need for CDS update, and if the buffer status store BDS indicates channel delay timing in progress (BSO=CDT), then, in decision box 773,the channel code in the buffer channel store (BCS) 471 (FIG. 9) is loaded into the R5 storage register (BCO/R5) and, in decision box 774, the new channel delay in the buffer delay store (BDS) 478 (FIG. 9) is loaded into the R7 storage register (BDO/R7).

At line 775 the old channel delay is retrieved from the channel delay store (CDS) 510 (FIG. 10) and the new channel delay replaces the old in the channel delay store. At decision box 776, provided the R5 storage register status indicates that it is occupied (R5S=1), the contents of the R5 register are compared to the generated channel codes (GCC/C5). In decision box 775, provided the CCRR is in the 2 state (CCRR=2), when the time-slotted compare pulse arrives (TCF5=1), the old channel delay number is retrieved from the channel delay store and placed in the R6 storage register (CDO/R6). In decision box 778 the new channel delay number in register R7 is loaded into the channel delay store (R7/CDS), replacing the old number.

At line 779 the new and the old channel delay numbers are compared. If the CCRR is in the 2 state (CCRR=2) and the buffer status store indicates that channel delay timing is still in progress (BSO=CDT), then, at decision box 780, the old channel delay number is subtracted from the new delay number (R7−R6/R7). In decision box 781, if the difference is less than some fixed amount of a few milliseconds (|R7−R6|<L=1), the CCRR is advanced to the 3 state (3/CCRR) to permit channel checking to continue. In decision box 782, if the difference between the old and the new delay numbers is greater than L (|R7−R6|<L=0), then the CCRR is advanced to the 6 state (6/CCRR) and a recheck of channel delay is requested.

At line 783 the buffer stores (FIG. 9) are updated if the CCRR is in the 2 state (CCRR=2) and the buffer status still indicates channel delay timing (BSO=CDT). In decision box 784 the buffer status is changed to channel noise timing (CNT/BSS). In decision box 785 the count in the buffer delay store is reset to 0 (0/BDS). In decision box 786 the CCDR is advanced to the 2 state (2/CCDR), indicating that the received tone level is within limits. At this time, of course, this is only an assumption.

In flow chart 790, level and noise timing take place. At line 791, if the CCRR is in state 3 or 6 (CCRR=3+6), indicating that such timing is in progress and if the buffer status store indicates that channel noise timing is in progress in this timeslot (BSO=CNT), then, in decision box 792, the buffer delay store is advanced (BDO+1/BDS) with a timing granularity of 1.2 millisecond (GC1.2MS=1). When the buffer delay code reaches 15 (BDO=15), representing about 20 milliseconds delay from the leading edge of the tone burst, the tone level outputs of the analog threshold circuits are used to update CCDR to a final tone level decision. In decision box 793 the CCDR is set to the 1 state (1/CCDR) if the received tone is less then −3 dB of the nominal level and, in decision box 794, a 3 is set into the CCDR (3/CCDR) if the received tone level is high, i.e., more than 3 dB above the nominal level (TONE+3=1). If the received tone is within the ±3 dB range, the CCDR is left in the 2 state set in decision box 786.

After the buffer delay timing code reaches 150 (BDO=150), about 180 milliseconds have elapsed and it is time to check the noise level during the second silent interval. This 180 millisecond delay insures that all the transients of the tone burst have died out before a noise level measurement is recorded.

In decision box 800, if the noise level is out of desired limits (NOISE OL=1), but not failed (NOISE FAIL=0) and providing the CCDR indicates that the tone level was within limits (CCDR=2), then the CCDR is advanced to the 4 state (4/CCDR), indicating that the channel is noisy. In decision box 795, if the channel is noisy (NOISE OL=1), but not failed (NOISE FAIL=0), and if the CCDR is in either state 1 or state 3 (CCDR=1+3), indicating that the tone level was out of bound either high or low, respectively, the CCDR is advanced to state 5, indicating that the channel is both noisy and out of level limits.

In decision box 796, if the noise level is unacceptable (NOISE FAIL=1), a 6 state is loaded into the CCDR register (6/CCDR) indicating that the channel has failed the noise test.

At line 797 a channel check status update is requested when the buffer status store indicates channel noise timing (BSO=CNT) is complete (BDO=150). In decision box 798, if the CCRR is in state 3, indicating level and noise check timing after a normal delay check (CCRR=3), then this register is advanced to state 4 (4/CCRR). If the CCRR is in state 6 (CCRR=6), indicating the delay is out of bounds, the CCRR is advanced to state 5 in decision box 799 (5/CCRR) to indicate that a recheck is necessary because the measured delay differs by too great a margin from the old delay. Either state 4 or 5 will initiate an immediate CCS update and channel check completion at the receiver.

In FIG. 17 there is shown the channel completion flow charts for the TASI receiver. In FIG. 17 the flow chart 810 provides for channel check status updating. The channel check status store (CCS) 505 is shown in FIG. 10. It is used as shown in Table IV to keep track of the current status of each channel as determined by the channel check function.

In line 811 of flow chart 810 the channel check candidate number is loaded during the HO channel scanning period of the RT2 trunk scanning interval. In decision box 812 the R5 storage register is reset (R/R5), as shown in decision box 772 in FIG. 16. The channel code is now retrieved from BCS 471 (FIG. 9) and stored in the R5 storage register as shown in decision box 813 (BCO/R5). If the CCRR is in state 4 or 5 (CCRR=4+5) indicating that CCS update is required, and if the buffer state store indicates channel delay timing or channel noise timing (BSO=CDT+CNT), then the channel candidate code in the buffer channel store (BCS) 471 (FIG. 9) is loaded into the R5 storage register BCO/R5).

In line 814 the CCS is actually updated. In decision box 815 it is noted that in decision box 776 of FIG. 16 the contents of the R5 storage register is compared to the generated channel codes (GCC/C5). As a result of these comparisons, a compare pulse is generated (TCF5=1) in the timeslot assigned to the channel candidate code. If the CCRP is in the 4 or 5 state (CCRR=4+5) indicating that a channel check status update is necessary, then the following update functions are performed. In decision box 816, if the CCDR is in state 2 (CCDR=2), indicating that the received tone level was within limits, then a status of "normal" is entered into the channel check status store (NOR/CCS).

In decision box 817, if the CCDR is at state 1 (CCDR=1), indicating that a low tone level has been received, then the L1 status is entered in the channel check status store (L1/CCS) indicating as shown in Table IV that the tone level was out of limits on the low side. In decision box 818, if the CCDR is in the 3 state (CCDR=3), indicating that the tone level was out of limits on the high side, then the L2 is entered in the channel check status store (L2/CCS) indicating this condition. In decision box 819, if the CCDR is in the 4 state (CCDR=4), indicating that the channel is noisy, then the NI status is entered in the CCS (N1/CCS) to record this condition. In decision box 820, if the CCDR is in the 5 state (CCDR=5), indicating that the channel is both noisy and out of level limits, then the status of LN is entered in the channel check status store (LN/CCS) to indicate this condition.

In decision box 821 if the CCDR is in either the 0 state, indicating that a tone has not been received at all, or if the CCDR is in the 6 state, indicating that the channel has failed on the noise test (CCDR=0+6), and also provided that this channel has not failed a channel check previously (CCO ≠ F1+F2), then the FAILED ONCE status is entered in the channel check status store (F1/CCS). In decision box 822, if the CCDR is in the 0 or 6 state (CCDR=0+6), and if the channel check status indicates that this channel has already failed once (CCO=F1), then the channel check status store is marked with a "failed twice" status (F2/CCS). In decision box 823, if the CCDR is in the 0 or 6 state (CCDR=0+6) and if the channel check status does not indicate previous failures (CCO ≠ F1+F2), then the CCRR is advanced to the 5 state to initiate a recheck of that channel. In decision box 824, if the CCDR is in the 0 or 6 state (CCDR=0+6), and if channel check status indicates a previous failure (CCO=F1+F2), then the CCRR is placed in the 4 state to prevent a recheck request from being initiated.

In line 825, an automatic request to print channel status is removed in the same channel timeslot (TCF5=1) and for the same CCS update states of the CCRR (CCRR=4+5). In decision box 826, if the CCDR is in the 2 state (CCDR=2), indicating that the tone level is within limits, and providing that the channel check status store indicates that this channel has previously been within limits (CCO=OK), the state of the CCDR is advanced to 7 (7/CCDR) to indicate that it is not necessary to print the test results.

It will be noted that provision has been made to automatically print messages on a teletypewriter receiver in response to changes in channel test results. Alarms may just as well be given by lights or bells but the printed record has the advantage of providing a permanent record which easily distinguishes between many different kinds of test conditions and times of occurrence.

In decision box 827, if the CCDR was in the 1 state (CCDR=1), indicating that a low level tone had been received, and if the channel was previously marked as failing the low level test (CCO=L1), then the CCDR is advanced to state 7 to prevent the printing of the test results. In decision box 828, if the CCDR is in state 3 (CCDR=3), indicating that the tone level is high, and if the channel check status indicates that the tone level was previously high (CCO=L2), the printing function is disabled by advancing the CCDR to the 7 state (7/CCDR). In decision box 829, if the CCDR is in the 4 state, indicating that the channel is noisy, and if the channel check status is in agreement that the channel is noisy (CCO=N1), then the CCDR is likewise advanced to the 7 state (7/CCDR). In decision box 830, if the CCDR is in the 5 state indicating that the channel is both noisy and out of level limits, and if the channel check status is in agreement (CCO=LN), then the CCDR is advanced to the 7 state (7/CCDR) to prevent printing. In decision box 831 if the CCDR is in either the 0 state or the 6 state (CCDR=0+6), indicating either that the tone has not been received or that the channel has failed the noise test, and if the channel check status is in agreement that a prior fail condition existed (CCO=F1+F2), then the CCDR is likewise advanced to the 7 state (7/CCDR) to prevent printing.

It will be noted that in line 814 a complete report of the results of the channel check is transferred from the channel check data register (CCDR) to the channel check store (CCS) 505 in FIG. 10. In this connection, it should be noted that the CCDR must be reused for each channel check assignment and hence cannot be used to retain a permanent record of the results of channel check. The channel check status store 505

(FIG. 10), on the other hand, is time-slotted so as to provide a storage position for the status of each channel of the transmission system. In line 825 the printout of the test results is permitted only when that test result changes from the previously recorded results. Attendant personnel are therefore alerted only when a change in status occurs.

At line 835, during the H2 trunk scanning period, the recheck requests and buffer clears are handled. Thus, if the CCRR is in state 4 or 5 (CCRR=4+5), indicating that an update of the CCS was necessary, and if the buffer status store indicates that channel delay timing or channel noise timing is in progress (BSO=CDT+CNT), it is then necessary to handle recheck requests or buffer clears. In decision box 836, if the CCRR is in state 4, indicating that a recheck is not necessary, the buffer timeslot is cleared by marking it as available (AVV/BSS). On the other hand, if a recheck is requested (CCRR=5), in decision box 837 the remote signal data status (RSD) replaces the timing status in the buffer status store (RDS/BSO). At the same time, in decision box 838 the channel failed status (CFD) is loaded into the buffer trunk store (BTS) 470 of FIG. 9 (CFD/BTS). These codes CFS and channel number, are used to signal the recheck request to the distant terminal. In line 839 during the H3 trunk scanning period, provided the CCDR is not in state 7 (CCDR ≠ 7) and provided the CCRR is in state 4 or 5 (CCRR=4+5), the generated channel codes are again compared in decision box 840 to the channel candidate code in storage register R5 (GCC/C5). The resulting compare pulse (TCF5=1) is used to request a printout of the appropriate timeslot of the channel status stores, as shown in decision box 841.

At line 842 the channel check function is completed in the last trunk timeslot (T399), providing the CCRR is in state 4 or 5 (CCRR=4+5), as shown in decision box 843. The state of the CCRR is advanced to 7 to prevent reprinting of the same status information and in preparation for the next channel check cycle. This completes the channel check function at the receiving terminal.

In FIG. 19, the source of the channel check tone was previously described. The channel check detectors 900 will now be described. The received channel check tones on trunk CKC are applied simultaneously to a tone filter 901, narrowly tuned to the 1800 hertz tone signal, and to a noise filter 902, broadly tuned across the speech band but which rejects all signals outside of the speech band. The output of tone filter 901 is applied to a bank of threshold level detectors 903 to separately indicate that the tone is 3 dB or more above the expected level on lead 904 (TONE+3), or 3 dB or more below the expected level as indicated by a signal on lead 905 (TONE−3), and that the tone has been detected at the −10 dB level, as indicated by a signal on lead 906 (TONE−10). These outputs on leads 904, 905 and 906 provide the (TONE+3), (TONE−3) and the (TONE−10) control signals utilized in FIG. 16.

The output of noise filter 902 is applied to a noise rectifier 907 and thence to a bank of threshold level detectors 908. If the noise is out of the desirable limits but is tolerable, a signal appears on output lead 910 which corresponds to the "NOISE OL" signal used in FIG. 16. If the noise exceeds a second (higher) level, an indication also appears on lead 909 which corresponds to "NOISE FAIL" signal used in FIG. 16.

A system has been described for sequentially checking a large plurality of message channels for transmission level, noise level and delay and for maintaining permanent undated records of these parameters of each channel. While these measurements are essential in a time assignment speech interpolation system where a large number of signal sources are interpolated on a single transmission channel, it is also of considerable importance for other types of transmission systems where the channel parameters influence the efficacy of the transmission system. Using the channel checking facilities described herein, it is possible to check each one of almost one hundred transmission channels once every three to five minutes. To do so, of course, it is necessary to remove the channel from service for approximately one-half second. This checking process is made entirely automatic and continuous and attendant personnel are alerted only when channel conditions change.

It will be apparent that the above-described arrangements are merely illustrative of numerous other arrangements which may constitute applications of the principles of the invention. Not only need the transmission channels not be utilized for time assignment speech interpolation, but the control circuits might well be implemented by programming a special purpose data processing machine rather than by using fixed wired logic, as herein described. Such other arrangements may be readily devised by those skilled in the art without departing from the spirit and scope of this invention.

What is claimed is:

1. A testing arrangement for multichannel communication systems comprising
 a source of test tone,
 means in said test tone source for generating said test tone in a testing period in which the tone is preceded by a timed silent period and followed by a timed silent period,
 means for selectively and sequentially connecting said source to the channels of said communication system,
 means for measuring the delay between the start of said test period and the receipt of said test tone,
 means for measuring the transmission level of said test tone,
 means for measuring the noise level in said following silent interval, and
 means for recording the parameters measured by said aforementioned measuring means for each said channel.

2. The testing arrangement according to claim 1 wherein said communication system comprises
 a time assignment speech interpolation system, and
 said means for selectively connecting said source comprises the interpolation switches of said time assignment speech interpolation system.

3. The testing arrangement according to claim 1 wherein said means for selectively connecting said source includes
 means for storing an identification code for a first one of said channels,
 means responsive to said identification code for enabling said selective connecting means, and
 means responsive to the termination of said testing period for incrementing said identification code.

4. The testing arrangement according to claim 1 wherein said means for measuring delay comprises
a counter,
means for entering a preselected count into said counter to represent the minimum possible delay of said channels,
means for advancing said counter at regular timed intervals following the start of said testing period, and
means for reading out the contents of said counter upon receipt of said test tone.

5. The testing arrangement according to claim 1 further including
timing means,
means responsive to said timing means for sampling said test tone at substantially the center thereof, and
means responsive to said timing means for enabling said noise level measuring means substantially in the center of said following silent interval.

6. The testing arrangement according to claim 1 wherein said means for recording parameters comprises
a storage arrangement for storing said parameters for each of said channels, and
means for transferring said parameters from said various measuring means to said storage means following each set of measurements.

7. An automatic channel testing system comprising
a plurality of transmission channels,
a signal source including gating means for interposing a timed test signal between two timed silent periods in a testing interval,
means for selectively connecting said signal source to each one of a plurality of transmission channels in sequence,
said connecting means including means for skipping those ones of said channels which are currently not in service, and
means for delaying the connection of each said channel until that channel is no longer being used,
means for measuring the transit time delay of each channel during a first one of said silent periods,
means for measuring the noise level of each said channel during the other one of said silent periods, and
means for measuring the transmission level of said test tone.

8. The automatic testing system according to claim 7 further including
delay timing means, and
means responsive to said delay timing mans for lengthening each testing cycle of said testing system to prevent excessive interference with normal transmissions on said transmission channels.

9. The automatic testing system according to claim 7 further including
a priority check initiating circuit,
means in said circuit for selectively testing channels marked for priority testing, and
means for marking for priority checking those ones of said channels previously exhibiting undesirable test parameters.

10. The automatic testing system according to claim 9 further including
means for selectively identifying transmission channels to be restored to service, and
means for marking said identified channels for priority testing.

11. A transmission channel testing system comprising
means for sequentially removing each of a plurality of transmission channels from active use for testing purposes,
means for transmitting a timed signal burst preceded by and followed by silent periods on each said channel so removed from service,
means for measuring the channel delay of each of said channels during the silent period preceding said signal burst,
means for measuring the transmission level of each of said channels during said signal burst, and
means for measuring the channel noise of each of said channels during said silent period following said signal burst.

12. The transmission channel testing system according to claim 11 further including
a time assignment speech interpolation system, and
said means for sequentially removing channels comprises the interpolation switches of said time assignment speech interpolation system.

13. The transmission channel testing system according to claim 11 wherein said means for sequentially removing channels includes
means for storing an identification code for a first one of said transmission channels,
means responsive to said identification code for enabling said sequential removing means, and
means responsive to the termination of said following silent period for incrementing said identification code.

14. The transmission channel testing system according to claim 11 wherein said means for measuring channel delay comprises
a counter,
means for entering preselected count into said counter to represent the minimum possible delay of said transmission channels,
means for advancing said counter at regular timed intervals following the start of said preceding silent period, and
means for reading out the contents of said counter upon receipt of said timed signal burst.

15. The transmission channel testing system according to claim 11 further including
timing means,
means responsive to said timing means for sampling said timed signal burst at substantially the center thereof, and
means responsive to said timing means for enabling said channel noise measuring means substantially in the center of said following silent interval.

* * * * *